(12) United States Patent
Timus et al.

(10) Patent No.: US 7,787,492 B2
(45) Date of Patent: Aug. 31, 2010

(54) RESOURCE ALLOCATION MANAGEMENT

(75) Inventors: Bogdan Timus, Sundbyberg (SE); Peter Ökvist, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1080 days.

(21) Appl. No.: 10/532,127

(22) PCT Filed: Oct. 31, 2003

(86) PCT No.: PCT/SE03/01691

§ 371 (c)(1),
(2), (4) Date: Oct. 24, 2005

(87) PCT Pub. No.: WO2004/064441

PCT Pub. Date: Jul. 29, 2004

(65) Prior Publication Data

US 2006/0140115 A1    Jun. 29, 2006

Related U.S. Application Data

(60) Provisional application No. 60/439,812, filed on Jan. 14, 2003.

(51) Int. Cl.
*H04J 3/16* (2006.01)
(52) U.S. Cl. ..................... 370/468
(58) Field of Classification Search ......... 370/230–236, 370/252, 253, 329–337, 431–444, 465, 468; 455/450–454, 509
See application file for complete search history.

(56) References Cited

U.S. PATENT DOCUMENTS 5,282,207 A * 1/1994 Jurkevich et al. .......... 370/468

5,987,021 A    11/1999 Erickson et al.

(Continued)

FOREIGN PATENT DOCUMENTS

EP    1 376 353    1/2004

(Continued)

OTHER PUBLICATIONS

International Search Report of PCT/SE2003/001691 mailed Feb. 10, 2004.

(Continued)

*Primary Examiner*—Kwang B Yao
*Assistant Examiner*—Kenan Cehic
(74) *Attorney, Agent, or Firm*—Nixon & Vanderhye P.C.

(57) ABSTRACT

The technology relates to resource allocation in communications systems. In such a system, the pool of resources that can be provided to connected user equipment for usage in conducting communications services are divided into multiple resources classes. This class division is based on a characteristic allocation time of resource allocation procedures that can be applied on resources of the different classes. For each class, a resource utilization measure is determined. It is then determined, based on this measure, whether or not a resource allocation procedure associated with the current class should be triggered. This selective triggering can be realized through a comparison between the measure and a threshold associated with the current class. Both the measure determination and selective triggering are performed for a given class before continuing with a next class, preferably starting with the class having slowest resource allocation procedures.

54 Claims, 10 Drawing Sheets

U.S. PATENT DOCUMENTS

| | | | |
|---|---|---|---|
| 6,493,317 B1 * | 12/2002 | Ma | 370/237 |
| 6,671,512 B2 * | 12/2003 | Laakso | 455/453 |
| 7,016,356 B1 * | 3/2006 | Profumo et al. | 370/395.4 |
| 7,072,313 B2 * | 7/2006 | Kronz | 370/322 |
| 2003/0118000 A1 | 6/2003 | Li et al. | |
| 2004/0001493 A1 * | 1/2004 | Cloonan et al. | 370/395.42 |
| 2004/0028054 A1 * | 2/2004 | Khurana et al. | 370/395.21 |
| 2004/0214582 A1 * | 10/2004 | Lan et al. | 455/452.2 |
| 2004/0252697 A1 * | 12/2004 | Wille et al. | 370/395.21 |
| 2005/0135320 A1 * | 6/2005 | Tiedemann et al. | 370/338 |
| 2007/0089147 A1 * | 4/2007 | Urdang et al. | 725/90 |

FOREIGN PATENT DOCUMENTS

| | | | |
|---|---|---|---|
| EP | 1376353 A2 | 1/2004 | |
| JP | 2001-512939 | 8/2001 | |
| JP | 2002-354533 | 12/2002 | |
| WO | WO 99/07170 | 2/1999 | |

OTHER PUBLICATIONS

3 GPP TS 23.107 v5.10.0 Technical Specification, $3^{rd}$ Generation Partnership Project; Technical Specification Group Services and System Aspects; Quality of Service (QoS) concept and architecture (Release 5), Sep. 2003.

Translation of Japanese official action, Jul. 28, 2009, in corresponding Japanese Application No. 2004-566367.

European official action, Nov. 10, 2009, in corresponding European Application No. 03 774 417.4-2412.

* cited by examiner

RESOURCE ALLOCATION MANAGEMENT

This application is the US national phase of international application PCT/SE2003/001691 filed 31 Oct. 2003, which designated the U.S. and claims benefit of U.S. Ser. No. 60/439,812, filed 14 Jan. 2003, the entire contents of each of which are hereby incorporated by reference.

TECHNICAL FIELD

The present invention generally refers to resource management in communications systems, and in particular to resource allocation in such systems.

BACKGROUND

A communications system manages and provides resources for use by e.g. its connected users for the purpose of enabling utilization of communications services in the system. For example, a radio communications system provides radio resources that its mobile users then utilize for conducting e.g. voice, packet transmission and streaming services.

The communications system typically only has access to a limited pool of resources, which are portioned out between the different users and services. Thus, the users and services can be regarded as competing for the limited amount of resources. In addition, in some communications system, or for certain resource types, the demands for resources change at specific events. Such events could be the addition of a new service, the closing of a communications session or a change in the requirements set by the end-user application. Often some explicit signaling follows these kinds of events. This signaling is then used to trigger the execution of a resource allocation procedure. For example, each time a new call is to be set up in a Global System for Mobile communications (GSM) system, a resource allocation unit or system has to look for an available channel, a time slot (radio resource) is then allocated to the user, or the call request is denied (which may result in a blocked call or a failed handover). In this example, the resource, i.e. time slot, is explicitly allocated and retrieved by a resource allocation procedure initiated by the allocation unit.

In other communications system, or for other resource types, the demand for resources may dynamically change due to other reasons. For instance, in a power controlled mobile communications system, such as Universal Mobile Telecommunications System (UMTS) or Code Division Multiple Access (CDMA) 2000 systems, the power control loop adapts the transmitted power in response to changes in the radio conditions experienced over the radio connection. Such condition changes can be the result of the mobility of the user equipment or caused by changes in the interference level experienced by the receivers. However, even for fixed radio connections, the power demand may vary due to changes in interference levels (caused by other systems), due to mobility issues or due to changes in the propagation environment (e.g. due to changes in the weather conditions). In this case, a resource allocation has to be continuously (or periodically) updated, so that the allocated resources match a current resource demand.

A particular aspect of some communications systems is that the resource allocation architecture is split into several layers. For example, the fast power control in Universal Terrestrial Radio Access Network (UTRAN) is a standardized procedure at link level, which treats each connection independently. As a consequence, the fast power control algorithm is sometimes not seen as a resource allocation algorithm. In this context, the resource allocation procedures are then viewed as trying to influence the resource demand. For example, the resource demand for a certain channel may be reduced, at least in average, by reducing the bit-rate available on that channel.

Accordingly, even in systems where the resource cannot directly be affected by a resource allocation procedure (as is the case with the power in UTRAN, discussed above), there might be procedures that ultimately influence the resource demand. For example, a down-switch from a dedicated channel with high bit-rate to a dedicated channel with lower bit-rate or to a common channel can be regarded as a resource pre-emption procedure and therefore can be used to cope with changes, such as an unexpected increase, in the resource demands.

In the present description, the expression "resource allocation procedure" includes any procedure that ultimately leads to a change in the amount of used resources, even if the procedure does not directly effect the resource usage. Thus, the expression also includes resource (re)allocation and pre-emption procedures.

A general case of a communications system with a limited pool of resources is a communications system, in which a sender transmits, in the same time, signals to a number of receivers. This can be exemplified by the downlink transmission between a base station and a number of mobile units in a UMTS system. A common pool of (radio) resources (e.g. the total downlink power, or carrier power) is shared between the different links. The specific amount of resources allocated to a link depends, among others, on the characteristics of the communications service provided by the sender on that link, but also on other external factors that cannot be controlled by the sender. For example, the amount of power required by a link in a mobile radio communications system depends on the bit-rate required by the communications service and can therefore be controlled by the sender by changing the provided bit-rate. However, the amount of power required by the link also depends on factors out of control for the sender, such as the position and movement of the mobile user equipment, the interference induced by other systems, etc.

Since the total amount of used resources (total resource utilization) in a communications system with shared resources is the sum of the amount of resources used on each link, i.e. allocated for each user, the increase in total resource utilization can be caused by an increase in the number of links and/or by an increase in the amount of resources used by the individual links. There is typically no problem as long as the total resource utilization is below the total amount of available resources, but as the total resource utilization increases too much and the resources become scarce, actions have to be taken to limit or reduce the resource utilization.

One way to limit the total resource utilization is to hinder the increase in the number of links, a procedure called admission control in the art. An alternative solution is to remove a link belonging to a user with low priority, when a high priority user requires access to a service. This is the case with SOS calls in a GSM system.

However, the increase in the total resource demand or utilization can, as was mentioned above, be due to increases in the amount of resources used for the links. Such increases in demanded resources can be caused by the mobility of the user equipment, changes in the behavior of a provided service, etc. In this case, the amount of resources presently allocated to one or several links has to be decreased, a procedure called congestion control in the art.

In a general case, in which users have different priorities and the services provided to the users have different demands, the admission and congestion control can be seen as particular cases of a resource allocation procedure. A relevant example is when the increased amount of resources allocated to a link with high priority, e.g. due to an increase of demanded bit-rate, the addition of a new bearer to a multi-bearer connection, etc., is done by reducing the amount of resources allocated to a low priority link.

The common solution for a communications system to prevent the resource demand or utilization from exceeding the maximum total resource limit, which is often determined by hardware limitations, is to initiate a resource allocation.

However, this resource allocation can in most cases be performed by several different allocation procedures. A problem then is how to select which allocation procedure to employ, but also how to select which link to be affected by the resource allocation, in the case of a choice between different procedures and/or links that leads to the same end-result. For example, some resource allocation procedures, such as channel down-switch, require rather extensive signaling and handshaking between the sender and the receiver and consequently require a long time before the allocation becomes effective. Other resource allocation procedures do not require handshaking and therefore have a relatively shorter execution time. This scenario is exemplified in FIG. 1.

At time $t_0$ the communications system is in a situation where the resource demand is unacceptable high and therefore a resource allocation procedure must be applied in order to reduce the overall resource utilization. Assume that in this situation two different procedures can be employed in order to reduce the resource utilization with the same amount. One of these two procedures requires handshaking between the sender and the receiver and, thus, has a long execution time (slow procedure). The second procedure is fast, i.e. has shorter execution time. In addition, both procedures result in the same quality of service (QoS) requirements for a user, as exemplified by the provided bit-rate of 64 kps. Call $t_1$ a time after the execution of the procedures, i.e. when the resource allocation is completed. Assume that a new resource shortage occurs and additional resources must be released (resulting in a reduction of bit-rate to 48 kps). Further assume that for the first case, i.e. employing a fast resource allocation procedure in time $t_0$, now only slow allocation procedures are available. However, for the second case, i.e. employing a slow resource allocation procedure in time $t_0$, now both fast and slow allocation procedures are available. At time $t_2$, the second resource allocation is completed.

The situations at time $t_0$, $t_1$ and $t_2$ can be regarded as states in a state machine. From an initial state A at time $t_0$ two different resource allocation procedures can be employed. Depending on the employed procedure, one of two states (B or C) is reached at time $t_1$. From the point of view of the amount of utilized resources and from the QoS (bit-rate) point of view, the two states are identical. However, the states differ in the procedures available for the next transition. Thus, transition from state B (to D) can only be performed with a slow procedure, while transition from state C can be done with a fast procedure (to E) or a slow procedure (to F).

An allocation unit or system is generally adapted to always employ to a fast resource allocation procedure, if available. With reference to FIG. 1, this corresponds to selecting a fast allocation procedure at time $t_0$, i.e. the transition from state A to B. However, it might then be possible that the subsequent resource allocation, i.e. from B to D, is time critical. Since now only slow procedures are available according to FIG. 1, system instability might occur if the resource demand becomes too large before the slow allocation is completely executed.

SUMMARY

The present invention overcomes these and other drawbacks.

It is a general object to provide an efficient resource management in communications system.

It is another object to provide a dynamic resource allocation in communications system.

Yet another object is to provide a resource allocation that maintains the possibility of employing fast resource allocation procedures.

A particular object is to provide a resource allocation that does not increase a packet delay experienced by streaming users above guaranteed quality of service (QoS) levels.

Briefly, the technology described in this application involves resource allocation in communications system. A pool of resources provided by the communications system, or a portion or a sub-system thereof, is divided into different resource classes based on an associated characteristic allocation time. Thus, resources from a given class can be allocated by one or several resource allocation procedures having a characteristic execution time. Correspondingly, resources of another resource class can be allocated by one or several other allocation procedures having other characteristic execution times. The characteristic allocation or execution time then corresponds to a total time from the triggering of a particular allocation procedure to the completion of the allocation. It may be possible that there is only one allocation procedure available for a given resource class. However, it may be possible to allocate resource of a certain class by means of several different allocation procedures, where these procedures have approximately the same allocation time or speed. Furthermore, the resources are divided into multiple classes, i.e. two or more classes, with different associated allocation times.

For example, the resources can be divided into two classes. In such a case, a first class comprises resources allocable with fast resource allocation procedures and a second class comprises resources allocable with slow resource allocation procedures. Slow procedures generally require extensive signaling and handshaking between the communications system and the unit, to which the system provides the resources. This handshaking and signaling result in a long execution time, typically in the order of several hundreds of milliseconds. In contrast to the slow procedures, fast resource allocation procedures typically have an execution time of a few or even less than hundred milliseconds.

The resource allocation method comprises that, for each resource class, a resource utilization measure is determined or estimated. This measure is preferably based on the total resource utilization for the current class. In a typical embodiment, the resource utilization measure is the amount of power of the current class that is used on communications links in the system. Based on this resource utilization measure, it is determined whether or not to trigger one or several resource allocation procedures on resources of the current class. The general object of this allocation is to reduce the resource utilization measure. Note that decreasing the utilization measure does not necessarily lead to a reduced amount of resources allocated from the affected class.

In a preferred example embodiment this selective allocation triggering is performed by comparing the resource utilization measure of the current class with an associated threshold. If the measure then exceeds the threshold, a resource allocation is initiated.

This utilization measure determination and selective triggering are repeated for all resource classes, preferably starting with the class containing resources that are allocable with the resource allocation procedures having the longest characteristic allocation time. The measure determination and selectively triggering are then performed for the class with the next second longest allocation time and so on ending with the class with the shortest allocation time. Since the characteristic allocation times for the classes differ, several allocation procedures may run parallel for the different classes.

The advantage of dividing resource into different classes and investigating and possibly allocating each resource class individually is that the possibility for the communications system of always having a pool of fast resource available for allocation increases. This means that the communications system most often, and preferably always, has access to a fast resources allocation procedure to use when the total resource utilization in the system becomes too large. Thus, when resources become scarce, the available fast allocation procedures can be triggered for quickly releasing some resources and thereby avoid the risk of system instability.

For a mobile radio communications system having radio resources of two resource classes, examples of slow resource allocation procedures include a channel switch from a dedicated channel with a first bit-rate to a dedicated channel with a second different bit-rate (dedicated channel re-configuration) and a channel switch from a dedicated channel to a common (non-power-regulated) channel. Slow procedures also comprise a handover from one radio access network to another radio access network and handover between different carrier frequencies (Inter-Frequency Handover (IFHO)). Also dropping an on-going call for connected mobile user equipment can in some applications be regarded as a slow allocation procedure.

A fast allocation procedure, in particular for affecting the downlink power of a downlink channel, is to limit access to the number of transport blocks available for transmission. Such a limitation in the available transport format combinations (TFCs) results in a reduction in the provided bit-rate and consequently a reduction in the downlink power.

In some applications it may not be possible to allocate resources (reduce the resource utilization) of a certain class without breaking a QoS contract. Thus, the communications system may currently provide a guaranteed amount of resources to a user. For the example with a mobile radio communications system with a fast allocable resource class and a slow allocable resource class, a situation can occur where the resource utilization measure of the slow allocable class exceeds its associated threshold and a slow resource allocation procedure is triggered. However, during the relatively long progression of this resource allocation, the radio conditions may worsen leading to an increase of this utilization measure. It may even be possible that this measure actually exceeds the threshold for the fast allocable class. In such a case, the pool of fast allocable resources become zero and no fast resource allocation procedures are available for reducing the total resource utilization in the communications system. Thus, the system has to wait for the completion of the slow allocation procedure until the resource utilization can be lowered. However, during this long execution the resource demands can increase further causing system instability.

Accordingly, a fast resource allocation procedure is then temporarily employed for releasing resources from a user that presently is provided a guaranteed amount of resources, e.g. reducing available transport blocks to a level below the guaranteed one. As a consequence, the system will temporarily deliver a less-than-guaranteed amount of resources to a user. Once the slow allocation procedure is completed, the amount of resources allocated to this user may the increased, e.g. by releasing a previously imposed TFC limitation. Thus, although a user at a certain moment may be provided with less than guaranteed amount of resources, the average resource amount provided over time to that user is at least according the guaranteed level.

This example embodiment of temporarily reducing the bit-rate (through use of TFC limitations) may result in breaking QoS contracts, in particular for streaming users, since the reduced transport bit-rate leads to data being accumulated in the sender's buffer and therefore to increased packet delay. By monitoring the total packet delay and the delay originating from TFC limitation for different users, imposed TFC limitations may be released (if the delays become too large) before QoS contracts are broken.

The technology offers the following example advantages:
Enables combined usage of slow resource allocation actions and fast resource allocation actions;
Ensures system stability by reducing the probability for the party effect and reducing the probability for the communications system to get into congestion;
Provides efficient resource utilization;
Enables usage of a low margin between working point and a maximum resource consumption level;
Ensures that delay for streaming users is kept within contracted QoS levels.

Other advantages offered will be appreciated upon reading of the below description of the example embodiments.

SHORT DESCRIPTION OF THE DRAWINGS

FIG. 1 schematically illustrates different resource states of a communications system reachable by performing slow or fast resource allocation procedures;

DETAILED DESCRIPTION

Figure 1:
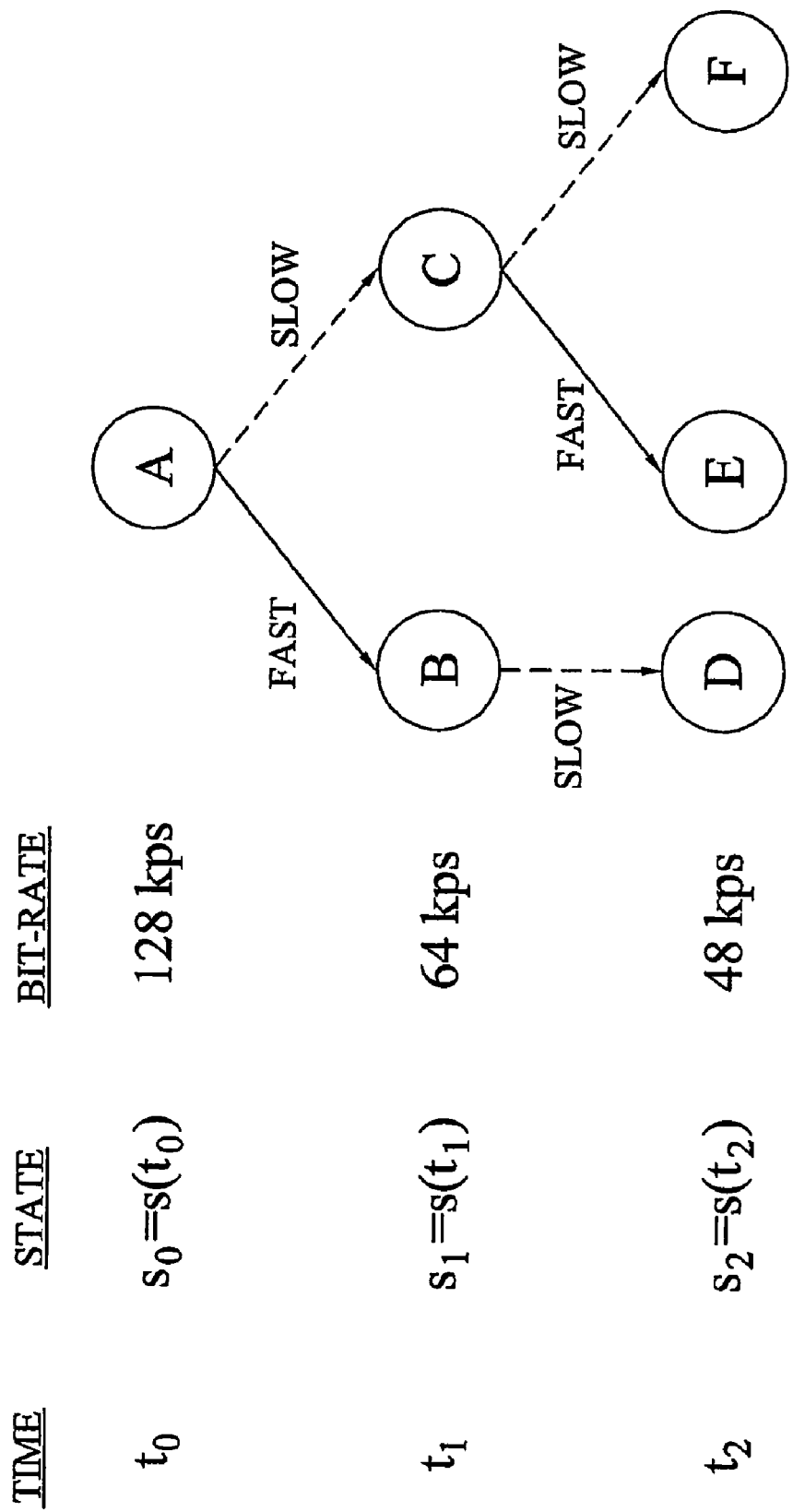

Throughout the drawings, the same reference characters will be used for corresponding or similar elements.

The present invention relates to management of resources, and in particular to allocation of resources in communications systems.

In the present description the expression "resource allocation" refers to both resource allocation and reallocation and to resource pre-emption discussed in the background section, unless otherwise specified. Thus, in order to facilitate understanding, resource allocation is used throughout the description, also for traditional resource pre-emption and reallocation. Note that, a resource allocation procedure can be used for allocating more, i.e. assigning, recourses to one or several services, links and connected user equipment. Furthermore, a resource allocation procedure can also be used for reducing the amount of resources for one or several services, links and connected user equipment.

A pool of available resources provided by a communications system, or a portion or a sub-system thereof, is divided into different resource classes or types based on an associated characteristic allocation time or speed. In other words, different resources may be allocated by different allocation procedures, where each procedure has a characteristic execution time. This time corresponds to a total time from the triggering of the particular allocation procedure to the completion of the allocation. It may be possible that there is only one allocation procedure available for a specific resource class. However, it may be possible to allocate resource of a certain class by means of several different allocation procedures, where these procedures have approximately the same allocation time or speed. Furthermore, the resources are divided into multiple classes, i.e. two or more classes, with different associated allocation times.

For example, the resources can be divided into two classes. In such a case, a first class comprises resources allocable with fast resource allocation procedures and a second class comprises resources allocable with slow resource allocation procedures. Slow procedures generally require extensive signaling and handshaking between the communications system and the unit, to which the system provides the resources. This handshaking and signaling result in a long execution time. For a radio communications system, such slow resource allocation procedures include a channel switch from a dedicated channel with a first bit-rate to a dedicated channel with a second different bit-rate (dedicated channel re-configuration) and a channel switch from a dedicated channel to a common (non-power-regulated) channel. Slow procedures also comprise a handover from a first radio access network to another radio access network and handover between different carrier frequencies, i.e. Inter-Frequency Handover (IFHO). Also dropping an on-going call for connected mobile user equipment can in some applications be regarded as a slow allocation procedure. Fast allocation procedures include reducing the bit-rate, e.g. by restricting available transport format combinations (TFCs), provided to mobile user equipment and performing an Adaptive Multi Rate (AMR) mode switch.

In the following description, "fast resources" ("slow resources") refer to resources allocable with a fast allocation procedure (slow allocation procedure), e.g. one of the procedures identified above.

It is also possible to employ a division resulting in more than two resource classes, e.g. a slow allocable resource class, medium allocable class, fast allocable class and a very fast allocable class. The actual number of resource classes may depend on the communications system, available allocation procedures, available communications services and other factors, such as expected resource utilization, traffic situation, etc. It may, further, be possible for a communications system to use a static resource class definition or change the class definition over time.

Figure 2:
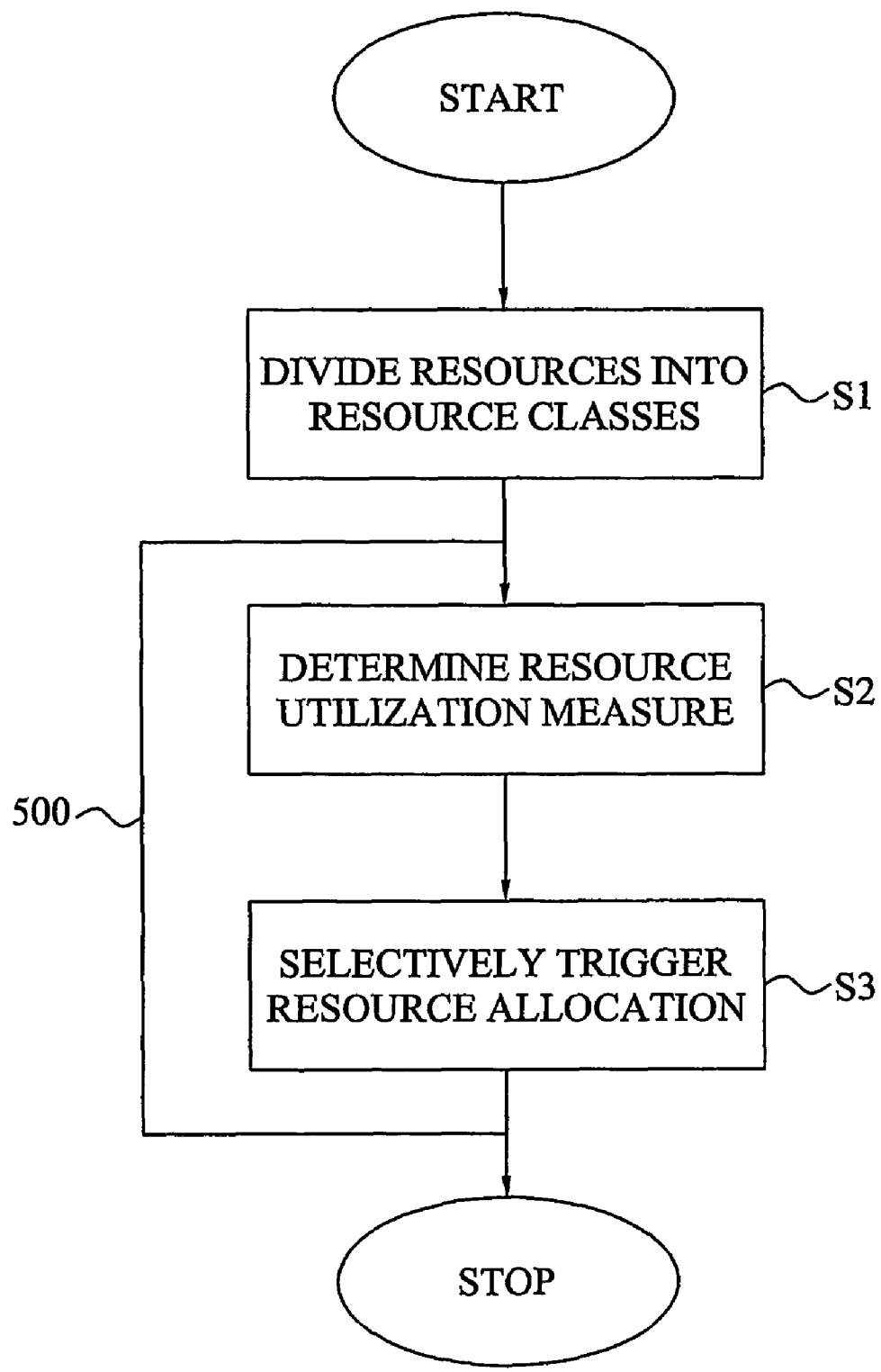
FIG. 2 is a flow diagram of an embodiment of a resource allocation method.

FIG. 2 illustrates a resource allocation method. The method starts with step S1, where the available resources are divided into different resource classes based on the allocation or execution time (speed) for the allocations procedure(s) that can be employed for respective class, which was discussed above. The method then continues by performing the steps S2 and S3 for each resource class. In step S2, a resource utilization measure is determined for the current class. This measure preferably corresponds to or is based on the total amount of resources utilized in the communications system for the current class, and possible the amount of utilized slower resources. A typical example of such a measure is the amount of power that may be allocated by procedures of the current class. In a radio communications system, by the "amount of power" is understood an estimate of the average power, where the average is considered, for example, over a radio frame. For example, in the case with one fast resource class and one slow resource class, the measure associated with the slow allocable class corresponds to the amount of power allocable with slow procedures. However, the measure associated with the fast allocable class preferably corresponds to the amount of power allocable with both slow and fast procedures. This principle may be applied also to the situation with more than two resource classes.

Once the resource utilization measure is determined, i.e. either explicitly calculated or estimated, for the current class, step S3 selectively triggers resource allocation based on the measure. Thus, in this step S3, it is determined or selected whether or not to allocate resources in the current class based on the utilization measure. For example, a resource allocation procedure associated with the current class could be triggered if the measure is too large. If is determined in step S3, based on the measure, that a resource allocation is to be trigged, an allocation procedure that can allocate resources of the current class is selected, if there is a choice between several different procedures having similar allocation times. This procedure is then employed for performing an allocation of resources from the current resource class. It is also possible to employ more than one allocation procedure of the current class in step S3.

The general object of the allocation is to reduce the resource utilization measure of the current class. Decreasing the utilization measure for a class, through performing allocation procedures on resources of the current class for a user, does not necessarily leads to a reduced amount of resources allocated to that user. This means that the experienced quality, e.g. bit-rate, may be kept the same, despite the fact that actions are taken for the resources provided to the user and that the utilization measure for the class is changing. For example, if a user is currently allowed to utilize only 64 kps on a 128 kps dedicated channel and a down switch to a 64 kps dedicated channel is initiated as the selected allocation procedure, the service will experience no sudden quality change (i.e. no change in bit-rate) and the amount of resources utilized will be fairly the same.

Both the step S2 and step S3 are repeated for each resource class, which is schematically represented by the line 500 in the figure. Thus, for the example with two resource classes, step S2 and step S3 are first performed for the first resource class and are then performed for the second resource class.

According to a preferred example embodiment steps S2 and S3 are preferably first performed for the resource class having the longest allocation time. The method then continues by repeating the steps S2 and S3 for the class with the next second longest allocation time and so on, ending with the class with the shortest allocation time. Since the characteristic allocation times for the classes differ, several allocation procedures may run parallel for the different classes. For example, if the utilization measure of a slow resource class is too large, a slow resource allocation procedure is triggered on the resources of this class. If the utilization measure of a fast resource class also is too large, a fast resource allocation is initiated with at least one of its fast procedures. If the execution time of the slow procedure is large enough, the fast allocation is triggered and possible also ended before the slow allocation is completed. In other words, the fast allocation procedure may be triggered and ended during the progression of the execution of the slow procedure.

The advantage of dividing resource into different classes and investigating and possibly allocating each resource class individually is that the possibility for the communications system of always having a pool of fast resource available for allocation increases. This means that the communications system most often, and preferably always, have access to a fast resource allocation procedure to use when the total resource utilization in the system becomes too large. Thus, when resources become scarce the available fast allocation procedures can be triggered for quickly releasing some resources and thereby avoid the risk of system instability.

The resource allocation method, or more precisely step S2 and step S3 of FIG. 2, is preferably executed when the resource utilization or demand in the communications system becomes too large. This may be due to one or several triggering events including changes in the number channels or links used in the system, the number of users connected to the system or the number of services per user. Furthermore, a change in the quality of services (QoS) requirements of an on-going service may result in a too large increase in resource utilization. Reception of updated measurement reports on e.g. mobility and interference changes in the system could be another triggering event. Also changes in the channel characteristics due to completion of a previously initiated procedure, for example a channel switch, and changes in the data traffic (this could be viewed as an external trigger, for example when measurements of sender buffer size or throughput are received, but could alternatively be viewed as a periodically triggering event, for example investigating whether to trigger allocation per radio frame in a radio communications system) could be a trigger. The resource demands may also change dynamically, as was discussed in the background section.

Figure 3:
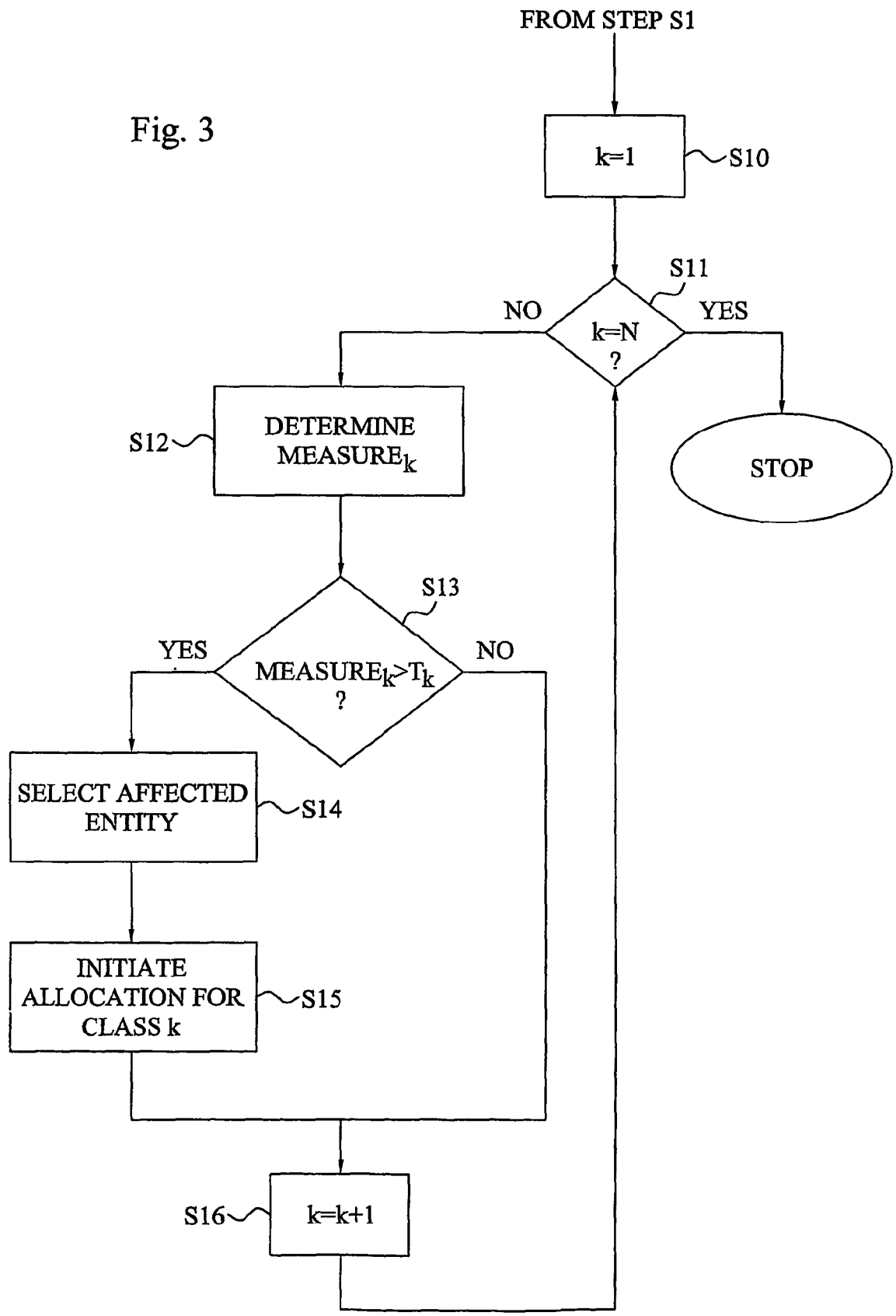
FIG. 3 is a flow diagram of an embodiment illustrating the measure determination and selectively trigger steps of FIG. 2 in more detail.

FIG. 3 is a flow diagram of an example embodiment illustrating the steps S2 and S3 of FIG. 2 in more detail. In the figure, N corresponds to the number of resource classes that are to be affected by the allocation method. This number N is equal to or larger than two. Note that it in some applications could be possible to have one or several resource classes that are not to be allocated with the allocation method. In such a case, these "additional classes" are not included in the number N.

In step S10, a class counter k is provided and set to one, i.e. starting with the first resource class. As was discussed above, this first class is preferably the class having resources allocable with the slowest resource allocation procedure(s). Step S11 investigates whether we currently are looking at the last class, i.e. if the class counter k equals N. If k=N the method ends. However, if the current class is not the last class, the method continues to step S12, where the resource utilization measure is determined for the current class. In the next step S13, this determined measure is compared to a threshold $T_k$, associated with the current class, in order to determine whether any allocation procedure belonging to this class should be initiated. If the measure exceeds the threshold, an allocation procedure should be performed on resources of the current class. It is possible to have other more advanced triggering approaches than a comparison of the measure with a threshold as triggering criteria. In addition, information of the amount with which the measure has to be decreased, i.e. the amount by which the measure exceeds the threshold, could be determined. The triggering may be enhanced, for example, by using filters, counters or other hysteresis mechanisms, without changing the triggering principle.

If the measure exceeds the threshold, the method continues to step S14. In this step S14, the entity to be affected is selected. This selection step chooses which communications service(s), link(s) (channel(s)) and/or user equipment to be effected by a resource allocation. It also selects which and the amount of resources of the current resource class that are to be allocated. The amount of resources to be allocated is preferably selected based on the information specifying the amount by which the measure exceeds the threshold. The entity selection can be made by taking into the account the impact that the resource allocation (reduction) has upon different user equipment. Thus, a selection that does not lead to dropping an on-going service (connection) or breaking a QoS contract is most often preferred. In either case, the number of users, links and services and the amount of resources to be affected by the allocation may be done with any of the selection procedures or policies used in the art, including such procedures and polices traditionally employed for congestion control algorithms.

Once the relevant entities are selected in step S14, a resource allocation procedure is initiated on resources of the current class for the selected entities in step S15. If there is a choice between several resource allocation procedures for the present class, one or some, possibly all, of the available procedures could be triggered in step S15. The exact choice of procedure is preferably done according to the network operator's preferences to give priority to one or another type of service, or to obtain a specific network behavior. Thereafter, in step S16, the class counter is increased by and the method continues back to step S11. Thus, steps S11 to S16 are repeated for all relevant classes until the counter k equals N. For each loop (steps S11 to S16), the characteristic allocation time associated with the current class preferably becomes shorter and shorter.

If it is concluded in step S13 that the utilization measure does not exceed the threshold, the method continues to step S16.

Note that if the exact amount, with which the measure must be decreased, is not determined, an iterative procedure can be employed. Then only one service (and one procedure) is selected in step S14. After execution of the allocation procedure for the selected service, the utilization measure is updated as if the procedure had already been executed. The triggering criterion is tested again in step S13. A new service is then selected in step S14 if the updated measure still exceeds the threshold in step S13. Thus, steps S13 to S15 are repeated for one service at a time and the measure is updated each time the small loop of steps S13 to S15 is completed until the measure does not exceed the threshold any longer. Then the method continues to the next class (to step S16).

In the following, the technology will be exemplified by a mobile radio communications system providing radio resources to connected mobile user equipment or mobile units. However, the technology is not limited thereto, but can be applied to other types of systems and/or resources. Thus, the resources can be used for providing communications services on links between a general sender and a general receiver. In a typical situation, the sender is a base station or another network node of a communications system providing (radio) resources to connected mobile units. However, the resources could alternatively be employed for communication between base stations or network nodes between different systems and/or within one system. Thus, in a general case the present technology can be applied to a system comprising a node with a limited amount of resources that are assigned to connections with other units. This node could be a wireless access point, e.g. base station, but also other types of nodes, including routers in wired or wireless communications system. These other units can be viewed as "end" nodes or terminals in system.

Figure 4:
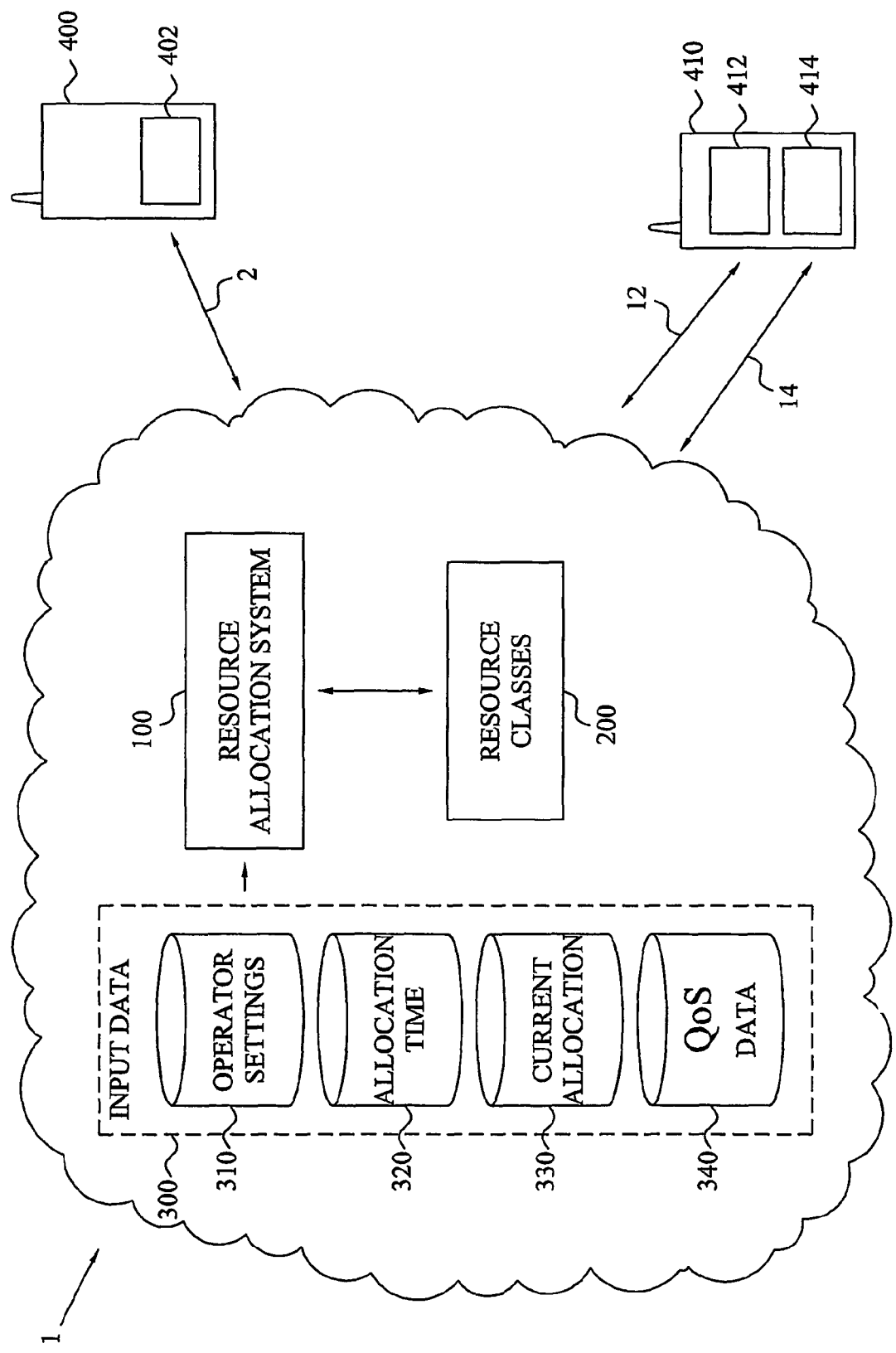
FIG. 4 is a schematic overview of an example of a communications system.

In FIG. 4 a mobile radio communications system 1 is illustrated. The communications system 1 comprises a resource allocation system or unit 100 arranged in one or several network nodes of the system 1 and is adapted for managing resource allocation. This allocation system 100 performs the portioning of radio resources from a common pool of resources, schematically illustrated by 200, to different services 402; 412, 414 and different connected mobile units 400; 410. The system 100 also selectively triggers resource allocation when the available radio resources become scarce.

The radio resources are employed by the system 1 for providing communications services, schematically represented by 402; 412, 414, to its connected mobile units 400; 410. It is possible for the system 1 to provide a single service 402 to a mobile unit 400, but also multiple services 412, 414 to a single mobile unit 410. The communications services 402; 412, 414 are provided by means of communications channels or links 2; 12, 14 established between network nodes, e.g. base stations, in the system 1 and the mobile units 400; 410. In FIG. 4 this is represented by one channel or link for each service.

The allocation system 100 typically receives input data and information 300 from other units 310; 320; 330; 340 in the communications system 1. For example, the allocation system 100 receives information of QoS requirements 340 of the services, a current resource allocation 330, execution time (speed) of available resource allocation procedures 320 and additional configuration settings 310, which are discussed in more detail below. These inputs can be databases 310; 320; 330; 340 implemented, for example, as registers in the system 1. The input data 300 can be used for determining when to initiate a resource allocation method and if an allocation procedure is to be triggered, which resources, links, users and/or services to select for the allocation.

Different end-user applications and units are characterized by different demands, e.g. sensibility of propagation delay, certain bit-rate demands, etc. In order to increase the resource allocation efficiency, bearer communications services may be adapted to these application-dependent characteristics so that the resource cost of providing the desired end-user quality can be reduced by selecting an appropriate service. The Universal Mobile Telecommunications System (UMTS) standard [1] provides a set of service classes and QoS attributes. For conversational Radio Access Bearer (RAB) services, these defined attributes include a guaranteed bit-rate (the communications system must provide it but the end-user application is not forced to use it), a maximum bit-rate (which can be higher than the guaranteed bit-rate and which the system only provides if enough resources are available) and a maximum propagation delay. Corresponding attributes exist also for streaming RAB services, whereas for interactive and background services only the guaranteed bit-rate is defined. The QoS requirements 340 may include these QoS attributes (guaranteed and minimum bit-rate and/or maximum propagation delay).

The current resource allocation 330 can comprise the current channel type used for each service, the code power (the peak power used for that channel or link). The allocation time data 320 could include information of available resource allocation procedures and their respective execution times. The additional configuration database 310 could provide information-restricting utilization of the allocation procedures in some particular cases.

For increasing the understanding, an exemplified allocation scenario will now be described for a UMTS system with reference to FIG. 5. In this example the resource of interest are the downlink carrier power (total downlink power). This should merely been seen as a typical resource example. In general, the principles can be utilized also in the power management on the uplink. This may be especially important in a scenario with multi-RABs on the uplink, because this increases the probability for services with different QoS requirements to be handled at the same time. The same principle could also be used also when it comes to other resources, such as the uplink interference measured by the system. However, most of the actions that the system can take to reduce the uplink interference require handshaking with the mobile user equipment. As a consequence, the difference in the execution times of the available allocation procedures (typically channel switch and handover to another carrier or to another system) is smaller. This means that the quantitative gain would be somewhat less.

Furthermore, in the present example the resource allocation procedures (resources) are grouped into two classes, slow procedures (slow resource class) and fast procedures (fast resource class). For the slow class, the following procedures are available:

dedicated to dedicated channel switch;
dedicated to common channel switch;
handover from Universal Terrestrial Radio Access Network (UTRAN) to Global System for Mobile communications (GSM)/General Packet Radio Service (GPRS) radio access network
handover between different frequencies (IFHO); and
dropping calls.

Possible fast procedures include:
TFC limitation; and
AMR mode switch.

Assume that the UMTS system includes a connected speech user (conversational RAB service) and a Web browsing user (interactive RAB service). Further assume that the lowest AMR mode that can be provided to speech users is 10.2 kps and that Web users may be provided with a 64 kps dedicated channel or a 128 kps dedicated channel. In this example, code power measurements are considered to be available for the resource allocation system or unit (for an accurate estimate of the amount of resources used by each link), typically in a Radio Network Controller (RNC) in the system.

According to the discussion in connection with FIG. 2, the allocation system triggers execution of fast and slow resource allocation procedures depending on the level of the fast and slow resource utilization measure, respectively. Fast (slow) measure should be interpreted as the resource utilization measure associated with the fast (slow) resource class. In this example the slow measure is the amount of power that may be allocated only by slow allocation procedures, whereas the fast measure is the total downlink power. Consider, also for the sake of simplicity that the triggering criterion is a simple comparison with thresholds $T_{SLOW}$ and $T_{FAST}$.

Assume that the network operator of the communications system has selected a configuration, e.g. stored in database 310 of FIG. 4, according to which the TFC limitation cannot be used to reduce the bit-rate below 32 kps when the 128 kps dedicated channel is used. However, it may limit the bit-rate even to 0 when the 64 kps dedicated channel is in use. In FIG. 5, the triggering thresholds are set to $T_{SLOW}$=6 W and $T_{FAST}$=13 W. For the sake of simplicity it is assumed that the speech user has 100% voice activity (no Discontinuous Transmission (DTX)) and that there is always data available for the Web browsing user in the send buffer.

At moment $t_0$ the speech user is in the 10.2 kps AMR mode and uses 1 W for its radio link. The Web browsing user utilizes the 128 kps channel to 100%, i.e. no TFC limitations, and uses 10 W. As any other channels are ignored in this example, the total downlink is 1+10=11 W, which is the value of the fast measure. Since TFC limitations can be used to reduce the bit-rate of the Web browsing user from 128 to 32 kps, but not lower (due to the operator selected configurations), the amount of slow allocated resources for the Web-browsing user are the average power that this user would consume if the TFC was used to limit the bit-rate to 32 kps. This amount can be estimated to $$10 \times \frac{32}{128} = 2.5 \text{ W}.$$

On the other hand, the speech user is already using the lowest AMR mode (corresponding to the guaranteed bit-rate) and therefore the amount of slow allocated resources for this user (service) is exactly 1 W. Therefore, at moment $t_0$ the slow resource utilization measure is 1+2.5=3.5 W.

Note that in the present example, the fast resource utilization measure can actually be related to a measured value, while the slow resource utilization measure is an estimate. Therefore, a different value than 3.5 W might be obtained if other prediction or estimation models are employed. In this example a linear model is used. However, other models can be employed to estimate the average link power and the average total power when the TFC limitations are used for reducing the bit-rate from 128 to 32 kps.

At moment $t_1$ the speech user has not moved and it still uses the same link power of 1 W. However, the Web browsing user has moved and now uses a link power slightly larger than 12 W. Performing the same estimation as at moment $t_0$ results in a value for the slow resource utilization measure of slightly above $$1 + 12 \times \frac{32}{128} = 4$$

W and the fast measure (total power) slightly above 1+12=13 W. As the slow measure is below the associated threshold ($T_{SLOW}$), no slow allocation procedures are triggered. However, the fast measure slightly exceeds the 13 W threshold and therefore a fast allocation procedure is initiated. Thus, in this example, a TFC limitation from 128 to 64 kps is triggered. At moment $t_2$, the fast TFC limitation is completely executed and the updated measures now are 4 W (same as moment $t_1$) and $$1 + 12 \times \frac{64}{128} = 7 \text{ W},$$

respectively.

At moment $t_3$ the transmission conditions for the Web browsing user has not changed, but the power consumption of the speech user has increased so that its link power now is slightly above 3 W. As a consequence, the slow measure is slightly above $$3 + 12 \times \frac{32}{128} = 6 \text{ W},$$

while the fast measure is slightly above $$3 + 12 \times \frac{64}{128} = 9 \text{ W},$$

respectively. As the slow measure slightly exceeds its corresponding threshold $T_{SLOW}$, a slow allocation procedure is triggered. Note that the allocation procedure is initiated despite the fact that the total average power (fast measure) is under control. There are presently three slow allocation procedures available: dropping the speech call, switching the 128 kps dedicated channel to a common channel or switching the 128 kps dedicated channel to a 64 kps dedicated channel. The first procedure has the disadvantage of breaking a QoS contract. The other two procedures do not break any QoS contract but the last one is to be preferred because it offers a better QoS to the Web browsing user.

The exact choice of procedure is done according to the network operator's preferences to give priority to one or another type of service, or to obtain a specific network behavior. This operator policy is preferably available for the resource allocation system, e.g. in the configuration database 310 of FIG. 4, so that the allocation system can perform the selection between the available procedures. It is also preferred if the configuration database provides rules for prioritizing between different allocation procedures depending on the service type and requirements. In addition, it should preferably also provide rules for prioritizing between users with the same service(s). For example, among two users with the same communications service type, the one using most resources (highest code power) or the one having the highest bit-rate can be selected for being affected by the procedure. This applies for any resource class.

At moment $t_4$, the 128 kps to 64 kps dedicated channel switch is completed and the average power used by the Web browsing user is 6 W. The user is still provided with 64 kps, so that the QoS for this user is not affected by the executed allocation procedure. Note in FIG. 5 that the execution time ($t_5$-$t_4$) for this slow procedure is much longer than a corresponding execution time ($t_2$-$t_1$) for the fast procedure. Since TFC limitations are allowed, according to the operator configurations, to reduce the bit-rate to 0 kps, the amount of slow allocated resource for the Web-browsing user is at $t_4$ equal to $$6 \times \frac{0}{64} = 0 \text{ W}.$$

(However, this assumption is a simplification used in this example for the sake of simplicity. In practice, the amount of slow allocated resources is larger than zero due to the associated control channel that consumes some resources. But, as previously mentioned, the exact way to estimate the amount of resource to be used by a channel in different circumstances does not affect the principles described in this case). Thus, the slow resource utilization measure is 3+0 =3 W and the fast resource utilization measure is 3+6=9 W.

As was discussed in the foregoing, the increase in resource utilization may be caused by other factors than mobility or degradation of the radio environment. A request to set-up a new RAB service may trigger fast and/or slow allocation procedures. For example, the request for a link set-up received from a new speech user may lead to resource release (reduction) from a Web browsing user. In addition, the set-up request from a user with high priority may lead to the drop of a speech call with lower priority. This does not necessarily means that no resources are allocated to the Web browsing user.

At moment $t_5$ a request for a new link is received from a speech user whose link power is estimated to be 4.5 W. If the new link would be admitted, the slow measure would be 3+0+4.5=7.5 W and the fast measure would be 3+6+4.5=13.5 W. If the link request is permitted, the two measures exceed respective thresholds and therefore the admission is typically denied. However, if the new speech user has higher priority than the user that is already present in the system, the admission of the new user leads to the drop of the currently connected speech user, which is a slow allocation procedure. Note that the admission of the new user may temporarily lead to a total power (fast measure) increase above the $T_{FAST}$ threshold. Therefore, three allocation procedures are initiated and will run in parallel: the admission of a new user (slow procedure), the dropping of the old speech user (slow procedure) and the reduction of the bit-rate of the Web browsing user from 64 to 32 kps by TFC limitation (fast procedure).

In the short time interval between $t_5$ and $t_6$, which is need for the TFC limitation to be executed, it is possible for the average total downlink power to increase above 13 W. This uncertainty is due to the fact that the execution of setting up a new link and disconnecting another connection are two uncoordinated transitory procedures. However, the restricted time during which the fast measure exceeds its threshold is a very short period compared to the time interval required to complete the set-up and/or disconnection. At moment $t_6$ the slow measure can be at most 3+0+4.5=7.5 W (if the new connection is already set-up, but the old one is not yet disconnected), while the power used by the Web browsing user is $$6 \times \frac{32}{64} = 3 \text{ W}.$$

Therefore, the fast measure is at most 3+3+4.5=10.5 W.

At moment $t_7$ the disconnection of the old speech user is completed. The amount of slow allocated resources now consists of the resources used by the new speech user, i.e. 4 W. Furthermore, the fast measure is $$4 + 6 \times \frac{32}{64} = 7 \text{ W}.$$

According one aspect, the resource allocation method may be augmented with a triggering mechanism that allocates resources without waiting for an explicit request for increased resource allocation. For example, with reference to FIG. 5, TFC limitations are used to limit the total power utilization during the link admission process, in order to avoid the unacceptable increase of the average total downlink power during this transitory period ($t_7$-$t_5$). At moment $t_7$, the fast resource utilization monitor (total downlink power) is below its associated threshold of 13 W and it would be possible to remove the TFC limitation imposed on the Web browsing user. In such a case, the user is allowed to utilize up to 64 kps. Since this operation is the reverse of the TFC limitation, their execution times are similar, i.e. removing an imposed TFC limitation is also a fast resource allocation procedure. When this resource assigning procedure is completed at moment $t_8$, the fast measure is 4+6=10 W.

Thus, when the demands for resources decrease and the measures for the different classes decrease, resources may be allocated or assigned for users, thereby increasing the amount of resources utilized for certain services and users. This could be accomplished by, for each resource class, compare its associated utilization measure with a second threshold (h*T). Then if the measure falls below this second threshold, more resources are allocated to certain users.

The value of this second threshold h*T could be equal to or lower than the value of the first threshold (T). However, in order to avoid a self-induced oscillatory behavior in the system, the second threshold h*T is preferably lower than the first threshold T, realized e.g. by setting 0<h<1. The marginal between the two threshold (which depends on the value of h) can be set based on input information from the communications system, e.g. present and expected future traffic situation, expected future resource utilization, etc. In addition, if two thresholds are used for more than one resource class, the marginal of respective class may the same for all classes or may differ between different classes.

Furthermore, if several different procedures for the same resource class can be taken and/or if different users or services can be selected for this resource assigning allocation, then priority and configuration principles can be employed in a similar way to the corresponding principles used when selecting procedures, users and services for resource limiting allocation procedures, discussed above.

Since the different resource classes are managed separately it is possible for an resource assigning ("unshrinking") procedure to be taken in one class in the same time with a resource limiting ("shrinking") procedure in another class.

Figure 6:
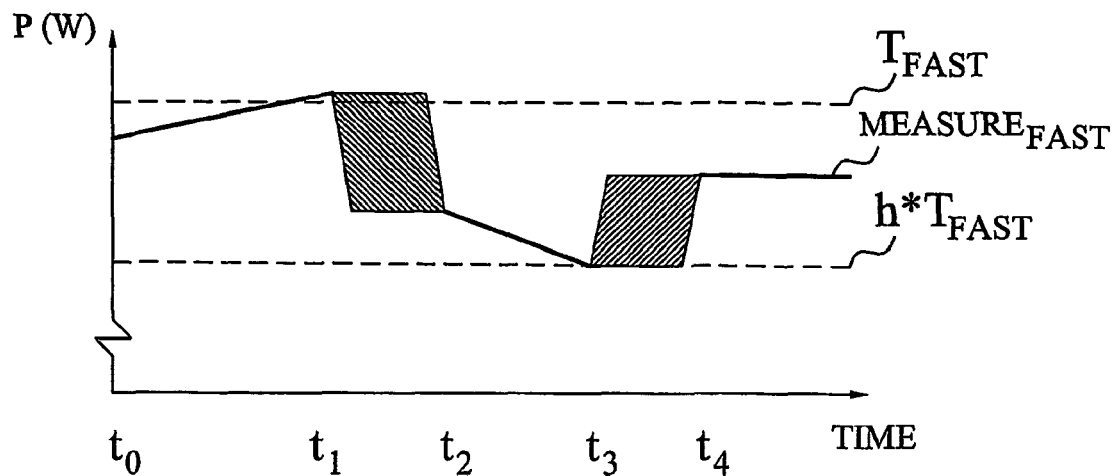
FIG. 6 is a time diagram illustrating lapse of a resource measure over time.

FIG. 6 illustrates the principles of using two different thresholds for each resource class, or some of the classes, here represented by the resource class allocable with fast procedure. During the transition from time $t_0$ to time $t_1$, the fast resource utilization measure increases and actually exceeds its associated first threshold $T_{FAST}$. As a consequence, a fast resource allocation procedure, e.g. TFC limitation, is triggered on some of the resource for the purpose of reducing this measure below the threshold $T_{FAST}$. At moment $t_2$, the resource allocation procedure is completed. At moment $t_3$, one of the connected users has moved so that it now uses less link power than at $t_2$. Due to this power reduction, the fast measure now is below its second associated threshold h*$T_{FAST}$. Thus, more fast resources can be allocated to a user by means of triggering a fast allocation procedure, e.g. releasing the earlier imposed TFC limitation. At moment $t_4$, this resource allocation is completed, increasing the value of the measure.

Figure 7:
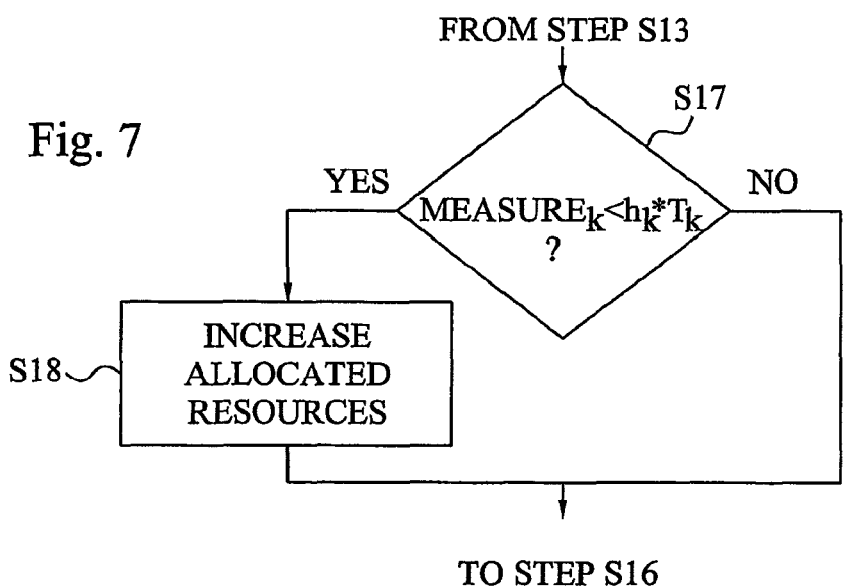
FIG. 7 is a flow diagram of additional steps of the resource allocation method of FIG. 4.

FIG. 7 illustrates the above-described additional steps of the resource allocation method. If the measure of the current class does not exceed the first threshold $T_k$, as determined in step S13 in FIG. 3, the method continues to the additional step S17. Here it is investigated whether the measure is below a second threshold $h_k$*$T_k$. If the measure exceeds this second threshold the method continues to step S16 in FIG. 3. However, if the measure is smaller than $h_k$*$T_k$ more resources of the current class can be allocated to connected user, e.g. by imposing an earlier imposed resource utilization limitation, in step S18. The method then continues to step S16 in FIG. 3.

A (automatic) threshold setting procedure can be employed for setting the values of some of the threshold values employed for the different resource classes. In a preferred example embodiment only one threshold is explicitly set, while the other thresholds are (automatically) determined based on this threshold.

Figure 5:
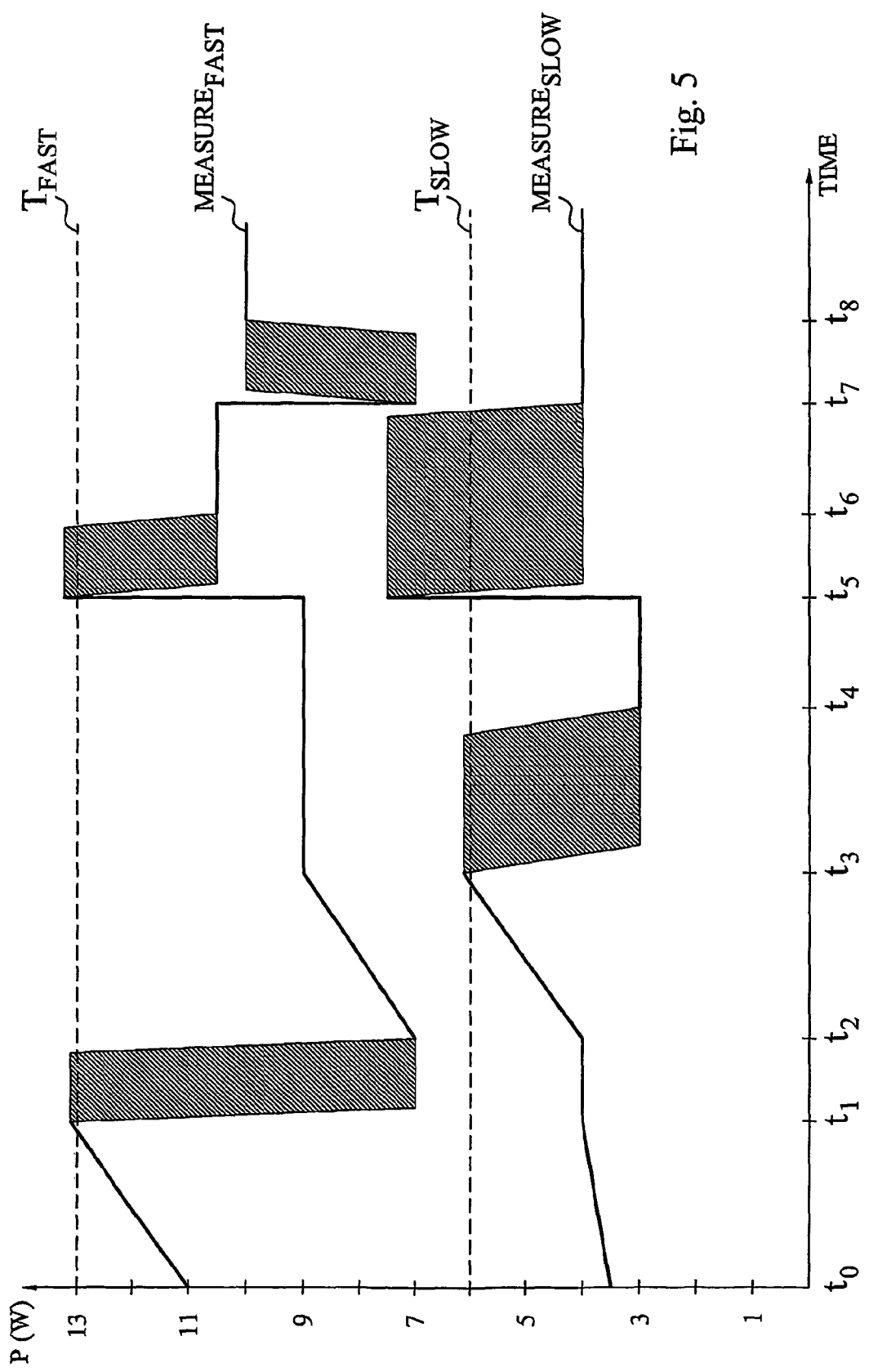
FIG. 5 is a time diagram illustrating the lapse of resource measures.

In order to understand the purpose of this threshold setting, a closer analysis of the two classes case as exemplified in FIG. 5 follows. The sudden increase in the resource demand at moment $t_5$ is only slowly coped with by the slow allocation procedures. Under these circumstances the fast procedures are attenuating these effects in a similar way as the dampers of a car are working on rough terrain. Thus, fast procedures are employed at moment $t_5$ to reduce the resource demand. Consequently, the pool of fast allocable (shrinkable) resources, i.e. those resources that cannot be allocated by slow procedures, is reduced from 13.5−7.5=6 W at moment $t_5$ to 10.5−7.5=3 W at moment $t_6$. This is similar to the squeeze of the car's dampers when the wheel passes over a stone. When the threat for a congested situation ceases, i.e. the execution of the slow procedure(s) is completed, a reverse fast allocation procedure is used to expand the resource utilization, so that the pool of fast allocable resources increases from 7−4=3 W at moment $t_7$ to 10-4=6 W at moment $t_8$. Thus, the pool of fast allocable resources temporarily decreases from 6 W to 3 W, in order to cope with the sudden increase in the slow allocated resources, and then returns to the initial value (6 W).

The difference between the two thresholds $T_{FAST}$ and $T_{SLOW}$ can be regarded as the uncompressed (unshrinked) length of the car's dampers. As the optimal length of these dampers depends on the expected roughness of the road, the optimal difference between the two thresholds can be related to the expected variations of the slow allocated resources. This in turn depends, for example, on how large the unexpected increase can be, i.e. on the dynamics of the radio environment in the radio communications system, how fast the slow procedures can be completely executed, how frequent these resource demanding events are, etc.

An automatic procedure could use e.g. $T_{FAST}$ as reference and then determine the other threshold ($T_{SLOW}$) in an adaptive fashion, based on a feedback loop. The resource allocation unit or another unit in the communications system may evaluate the probability $\epsilon$ for the slow allocated resources (the measure of this slow resource class) to be equal to or larger than $T_{FAST}$. If such a situation would occur, the pool of fast allocable (shrinkable) resources is reduced to zero and no fast allocation procedures can any longer be employed for reducing the total resource utilization below $T_{FAST}$. The current value of $T_{SLOW}$ can then be updated with the purpose of keeping the probability $\epsilon$ at an acceptable level. A too large probability $\epsilon$ means that the slow allocated resources are allowed to increase too much with respect to $T_{FAST}$ and therefore slow procedures should be triggered at a lower level than the current value of this slow resource measure. Consequently, at a high probability $\epsilon$, the value of $T_{SLOW}$ should be decreased. It is also possible to use different evaluation criteria and different updating procedures, e.g. jumping and scaling, than the above discussed without changing the basic concept of this embodiment. The principles may also be applied to systems with more than two different resource classes. In such a case, one or several thresholds may be fixed and the remaining thresholds could be determined based on some or all of these fixed values.

As was discussed above, the resource allocation system can be configured in such a way that in certain circumstances it is not allowed to execute a specific resource allocation procedure, even if this procedure would be practically possible. The reason why such an available procedure is not allowed to be used could be the QoS requirements or that a certain system behavior is desired. For example, if the bit-rate currently provided to a service already is as low as the guaranteed bit-rate, an allocation procedure that further reduces the bit-rate is not allowed, although it might be available.

Figure 8:
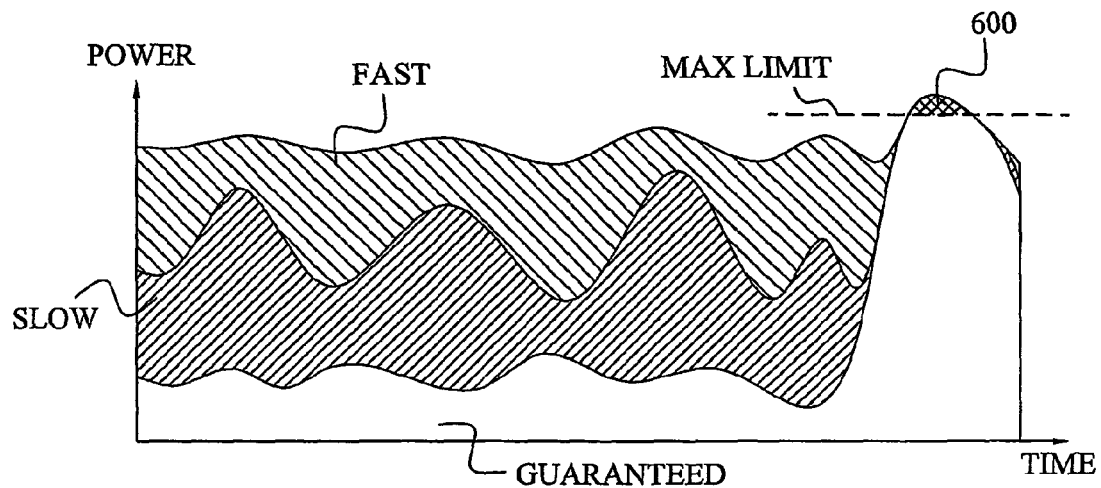
FIG. 8 is a diagram illustrating the division of resource into different resource classes.

With reference to FIG. 8, in the case of two (fast and slow) resource classes, the slow allocated resources can be regarded as comprising guaranteed resources that must be provided to users in order to fulfil QoS contracts, but also slow resources that are allocated in a best-effort fashion. In the present application, the expression "shrinkability" refers to the amount of resources (e.g. power) in a cell that can be reduced without breaking any QoS contracts. In this context, "fast shrinkability" corresponds to the amount of resources (power) in a cell that can be reduced by fast resource allocation procedures, such as TFC limitations, without breaking any QoS contract. Correspondingly, "slow shrinkability" refers to the amount of resources (power) that can be reduced in a cell by slow resource allocation procedures, i.e. other procedures than the fast TFC limitations, without breaking any QoS contract. Slow allocated resources can then be viewed as comprising the sum of guaranteed resources and slow shrinkability. In addition, "(fast) negative shrinkability" is referred to the amount of resources (power) in a cell that can be reduced by fast allocation procedures (TFC limitation) resulting in a reduction of the bit-rate below the guaranteed bit-rate level.

If the slow resource utilization measure exceeds the threshold associated with the fast class, the only way to reduce the total resource consumption below this threshold is to wait for the completion of one or several slow resource allocation procedures, since no fast procedures may be employed (the pool of fast allocable resources is zero) to avoid the congested situation. In this case only guaranteed resources are left for allocation, see 600 in FIG. 8. This unfavorable situation may be coped with according to another aspect. In this aspect, allocation procedures that otherwise would not be allowed are temporarily used, i.e. the guaranteed resources are (re)allocated. In the general case, if the measure associated with the i-th resource class exceeds the threshold of the j-th class (j>i), then procedures belonging to the classes i+1 to j, that otherwise are not allowed to be used due to configuration and/or QoS reasons, may temporarily be employed for reducing the actual resource utilization during progression of the triggered resource allocation procedure of class i.

In the particular case with two classes, this means that fast allocation procedures that are not allowed due to these configurations or QoS reasons could temporarily be employed if the slow resource utilization measure exceeds $T_{FAST}$. By "temporarily employed" is meant the fact that a reversed procedure is preferably used after a while, when the subsequently resource demand becomes reduced, such as after completion of slow resource allocation procedure(s), to restore the initial fast resource conditions.

Figure 9:
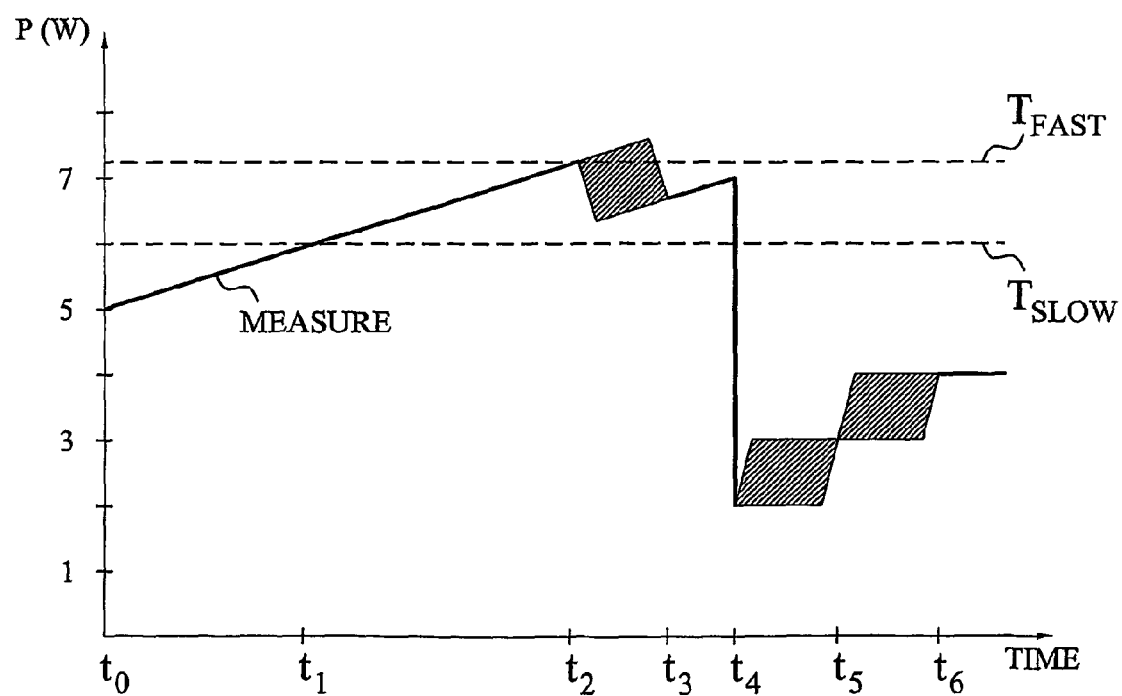
FIG. 9 is another time diagram illustrating the lapse of resource measures over time.

Consider the example in FIG. 9, where the triggering threshold for the slow allocated resource measure is set to 6 W and the fast measure (average total power) is set to 7.5 W. In this example, a first user is consuming 2 W for its guaranteed bit-rate and a second user utilize streaming services of 48 kps on a 64 kps dedicated channel. These 48 kps are a guaranteed bit-rate for the streaming service. Assume that the streaming user would consume 4 W if he used the channel at 100% capacity. Therefore, he presently uses $$4 \times \frac{48}{64} = 3 \text{ W}.$$

Further assume that available slow allocation procedures are limited dropping a call and handover to another system (another carrier or another radio access network). Available fast procedures are TFC handling (limitation and recovery).

The slow measure is 2+3=5 W at moment $t_0$. Since both users have allocated only guaranteed resources, the average total power (fast measure) is equal to the slow measure. This means that the value of the fast measure is identical with the value of the slow measure and that the pool of resources allocable with fast procedures is zero.

The first user then moves to an area with poor radio conditions so that it demands more and more resources, while the demands of the streaming user remain unchanged. Following this trend, at moment $t_1$, the slow measure exceeds is threshold of 6 W. As a consequence, a slow procedure is triggered. Assume that a handover to another system is initiated for the first user and the execution of this procedure is not completed until moment $t_4$.

Meanwhile, the increasing trend continues until the slow measure exceeds at moment $t_2$ the threshold of the fast resource class. According to the configuration, TFC limitation (fast allocation procedure) cannot be used to permanently release resources in this case (compare with exceeding the max limit in FIG. 8). However, resources can temporarily be released (allocated) from the fast resource class. Thus, TFC limitation is used to reduce the bit-rate of the streaming user from 48 to 32 kps. Thereafter the streaming user only utilizes $$4 \times \frac{32}{64} = 2 \text{ W}.$$

After the execution of the fast procedure (moment $t_3$), the power consumption is reduced to below the 7.5 W threshold and the congested situation is avoided. If this exception to the rule of not breaking QoS contracts not would have been employed, the average total power would have further increased and the risk for an unstable communications system would have been unacceptable. At moment $t_4$, the handover of the first user to another system is competed and the slow resource measure becomes 2 W. Furthermore, there is no risk that removing the TFC limitation would lead to a new increase of the slow measure above the threshold $T_{FAST}$. Therefore, at moment $t_4$, a fast procedure of removing the TFC limitation is triggered and at moment $t_5$ the user bit-rate of 48 kps is restored to the guaranteed value for the streaming user. In this case, the slow measure becomes $$4 \times \frac{48}{64} = 3 \text{ W}$$

and the value of the fast measure is still the same as this slow measure value.

In addition, the TFC limitation to 48 kps can be removed ($t_5$) too and thus providing 64 kps at moment $t_6$, after completion of the fast resource assigning procedure.

Thus, although the communications system temporarily delivers a bit-rate below the guaranteed level for a user, the average bit-rate over time for that user is still according to the QoS contract. In other words, fulfillment of QoS requirements and guaranteed service levels could be viewed as in average delivering the guaranteed contracted service, although at some instances the lower level is provided. This lower than agreed provided level could be compensated by, at other instances, providing a higher than guaranteed level.

When using this aspect of temporarily employing non-allowed resource allocations, there is a risk that the quality provided to the users becomes lower than the desired values. For example, in UMTS, the QoS requirements may become lower than the values contracted through the RAB attributes. In the following the description will be exemplified, but not limited to, the management of streaming services. However, the teaching could alternatively be applied to other forms of services.

In this example, the idea is to monitor the packet delay for the streaming user that has been affected by a non-allowed resource allocation procedure. The reason for this is that a reduced transport bit-rate results in data being accumulated in the sender's buffer and therefore to increased delay. According to this aspect, the bit-rate limitation associated with the temporary resource allocation is ceased (i.e. the initial bit-rate is restored, or another higher than this initial bit-rate is provided) when the delay threatens to exceed the maximum delay attribute in the QoS contract.

Since the communications system may comprise several streaming users that can be selected for being affected by the temporary TFC limitation, a priority mechanism that protect the users that have previously been affected by this procedure can be employed. Also a mechanism for differentiating between the delay cased by the temporary TFC limitation and the delay caused by the service by sending data at a higher bit-rate than the guaranteed through the contract could be used.

For a better understanding of this aspect, an implementation for UMTS systems is described in the following.

In this example, the "maximum delay" parameter in the QoS attribute list of the streaming RAB is explicitly considered. The amount of data in the downlink Radio Link Control (RLC) buffer is used to estimate the actual delay. The algorithm proposed and disclosed herein can then use this estimate in order to fulfil the QoS guarantees.

However, the packet delay may also increase due to traffic variations in the source traffic, e.g. when the streaming server sends data at higher rate than the contracted RAB, or due to other throughput affecting algorithms. The delay monitoring is therefore done to distinguish between the delay introduced by TFC limitations and the delay due to other causes.

Since the TFC limitation procedure will reduce the available number of transport block and hence postpone the transmission of some bits, the buffer size will increase. These extra bits, caused by the lower bit-rate, can be written as:

$$L_{TFC} = \sum_{i=1}^{users\ last\ TTI} (BR_{guaranteed} - BR_{i,now}) \times TTI_i, \quad (1)$$

where $L_{TFC}$ are the extra bits in the buffer, $BR_{guaranteed}$ is the guaranteed bit-rate, $BR_{i,now}$ is the current bit-rate during the current Transmission Timing Interval (TTI) and $TTI_i$ is the current TTI length. The summation is over all TTIs during the lifetime of the user connection. The total overall delay is then:

$$L_{now} = L_{ifNoTFC} + L_{TFC}, \quad (2)$$

where $L_{now}$ and $L_{ifNoTFC}$ are the current buffer length and the buffer length without any TFC limitations, respectively. Using expression (1) and (2) together and dividing both sides with $BR_{now}$, results in an expression for the delay ($D_{TFC}$) originating from the TFC limitation:

$$D_{TFC} = \frac{L_{TFC}}{BR_{now}} \quad (3)$$

$$= \frac{\sum_{i=1}^{users\ last\ TTI} BR_{guaranteed}\left(1 - \frac{BR_{i,now}}{BR_{guaranteed}}\right) \times TTI_i}{BR_{now}},$$

but also an expression for the overall delay, according to:

$$D_{TOTAL} = \frac{L_{now}}{BR_{now}} \quad (4)$$

$$= D_{ifNoTFC} +$$

$$\frac{\sum_{i=1}^{users\ last\ TTI} BR_{guaranteed}\left(1 - \frac{BR_{i,now}}{BR_{guaranteed}}\right) \times TTI_i}{BR_{now}},$$

where $D_{TOTAL}$ is the current delay and $D_{ifNoTFC}$ is the delay for the bits currently in the buffer if no extra "TFC-postponed" were added. By inspection of equation (4), it is evident that if $BR_{i,\,now}$ is equal to $BR_{guaranteed}$ for every TTI, i.e. no TFC limitation, during the lifetime of the user connection, no extra bits are added up. Thus, no additional delay occurs, i.e. $D_{TOTAL}=D_{ifNoTFC}$. It is also worth mentioning that the "system observable" is the total buffer size, i.e. $L_{now}$ and the corresponding $D_{TOTAL}$, and that the other quantities, e.g. $L_{ifNoTFC}$ and $L_{TFC}$, can be obtained by secondary calculations.

When the bit-rate for a streaming user has been reduced, the quality measure in the present example is defined for that user to be acceptable if the total delay ($D_{TOTAL}$) is below a pre-defined limit and if the TFC generated delay is lower than a pre-defined threshold, such as lower than a fraction of the total delay:

$$ok = if\ [(D_{TOTAL} < T)\ AND\ (D_{TFC} < kT)] \quad (5)$$

Equation (5) is used by the system to fulfil the QoS contract and therefore ensure the quality perceived by the end user.

Figure 10:
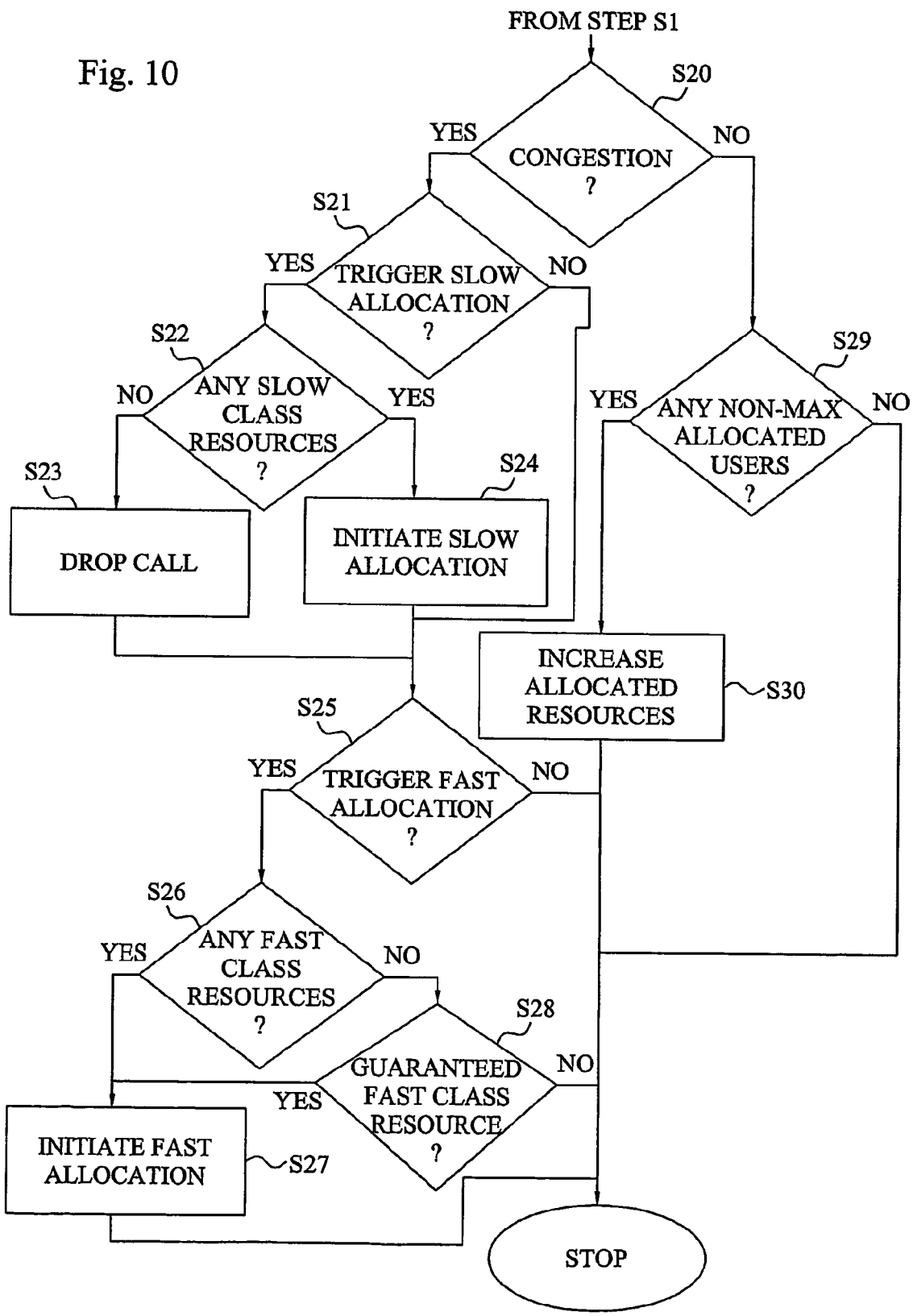
FIG. 10 is a flow diagram of another embodiment illustrating the measure determination and selectively trigger steps of FIG. 4 in more detail.

The flow diagram of FIG. 10 illustrates the principles of for this example. The allocation method starts in step S1 of FIG. 2 and moves to step S20, where it is investigated if a congestion situation is present. In step S21, the resource utilization measure for the slow resource class is compared to its associated threshold. If the measure exceeds the threshold, a slow resource allocation procedure should be triggered. Step S22 investigates if there are any slow resources to allocate (slow shrinkability). If no, an on-going call is dropped in step S23. However, if slow allocable resources are available, a slow allocation procedure is initiated in step S24. The method then continues to step S25, where the utilization measure for the fast resource class is compared to its threshold. If the measure is below (or equal to) the threshold the method ends, but if the measure exceeds the threshold a fast allocation procedure should be initiated. The method then continues to step S26 where the availability of fast resources to allocate (fast shrinkability) is investigated. If fast allocable resources are available, a fast allocation procedure is triggered in step S27 and the method then ends. However, although no fast resources are available, it might possible to temporary limit the available TFC for a user, at least until the slow allocation procedure is completed. If it is concluded in step S28 that TFC limitations can be employed, such a fast allocation procedure is initiated in step S27. Thus, by rapidly (execution time of a fast procedure such as TFC limitation is typically in the order of one or several TTIs) reducing the number of used transport blocks, the total downlink power consumption can be scaled down during the progression of the slow allocation procedure (which often takes at least several hundreds of milliseconds to be completely executed).

Using this temporary bit-rate-reducing algorithm, additional delay may be induced by the extra "non-sent" bits that accumulate in the buffer. To avoid this, once the congested situation is over, as determined in step S20, step S29 can investigate if there is any shrinked users present, i.e. any users that are affected by TFC limitations. If such users are present, more resources may be assigned to them by releasing the imposed TFC limitations in step S30.

Figure 11:
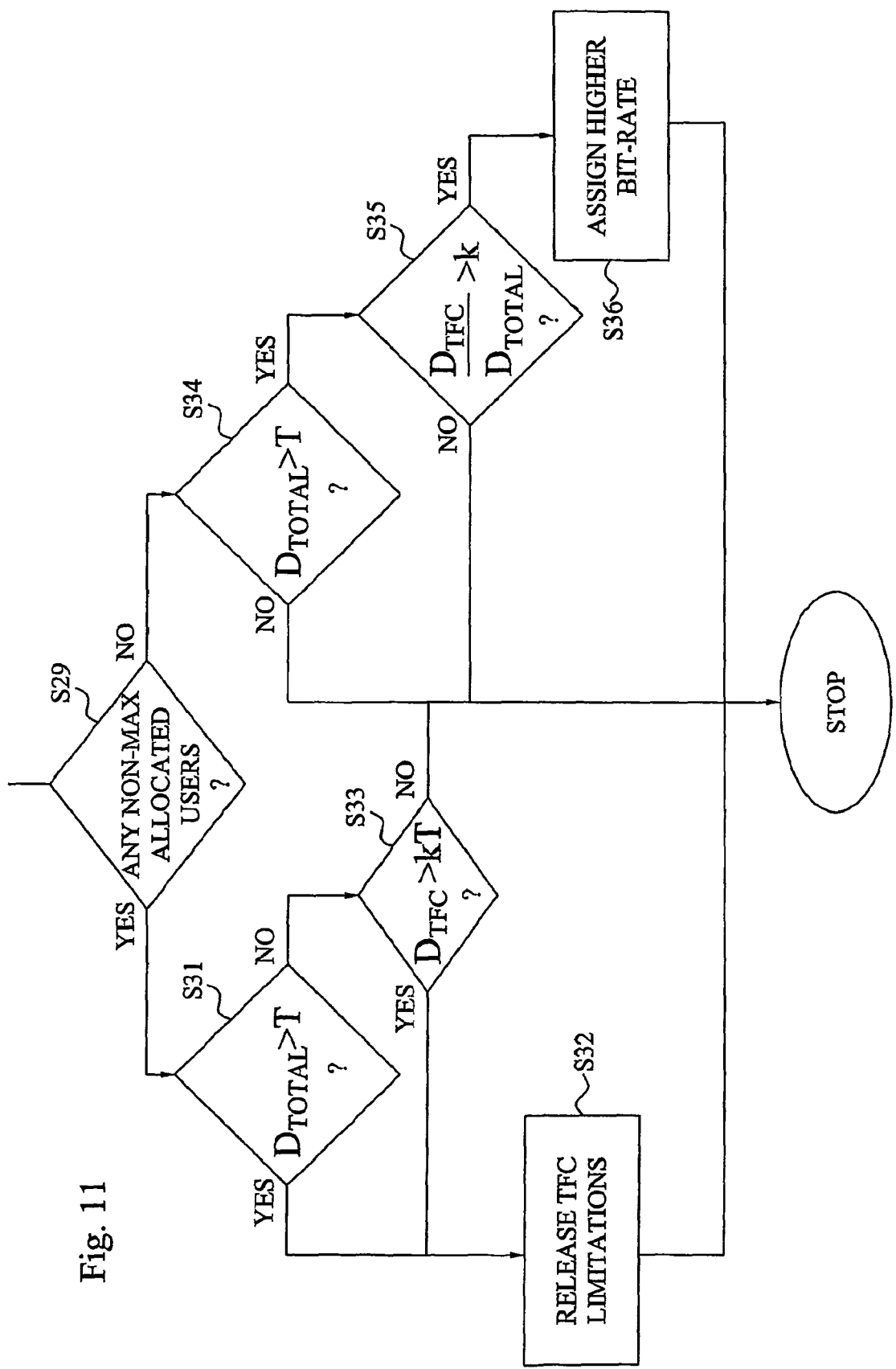
FIG. 11 is a flow diagram of an embodiment illustrating additional steps of the method of FIG. 10.

FIG. 11 is a flow diagram illustrating additional steps of selecting whether or not to release previously imposed TFC limitations. If step S29 determines that a user, for the time being, uses a lower transport block configuration, due to a TFC limitation, step S31 checks the current total delay. If the total delay is found to be too large, i.e. over a pre-defined threshold T, the number of available transport blocks are restored for that user in step S32. If the total delay is found to be smaller than the threshold T in step S31, another check is performed in step S33 to investigate if the portion of the total delay caused by the TFC limitation is too large. If this portion ($D_{TFC}$) exceeds a second threshold $kT$ ($0<k<1$), the TFC limitation has been in use too long (or too intense) and the bit-rate should be increased in step S32, since the RAB contract runs a risk of being broken.

The other main-path in the figure, is when some user previously has been "shrinked" but is presently not. In this case, step S34 first checks the current total delay and if the delay is found to be smaller than the threshold T, no contract is broken and no additional action is taken, i.e. remain on current TFC. If the delay is too large, the fraction of the total delay caused by TFC limitation is investigated in step S35. If this fraction is small, it is concluded that the total delay is too large but it is not caused by the imposed TFC limitation, but by some other actions. Such other actions could be when the core network (streaming server) provides data at a rate larger than guaranteed and, thus, risking to fill the buffer faster than expected. However, if the fraction is large, the TFC limitation has caused a too low bit-rate during a too long period. The user should then preferably be assigned a higher bit-rate in step S36. If TFC limitations are still present, this increase in bit-rate can be obtained by simply restoring the number of transport blocks for the considered user.

Figure 12:
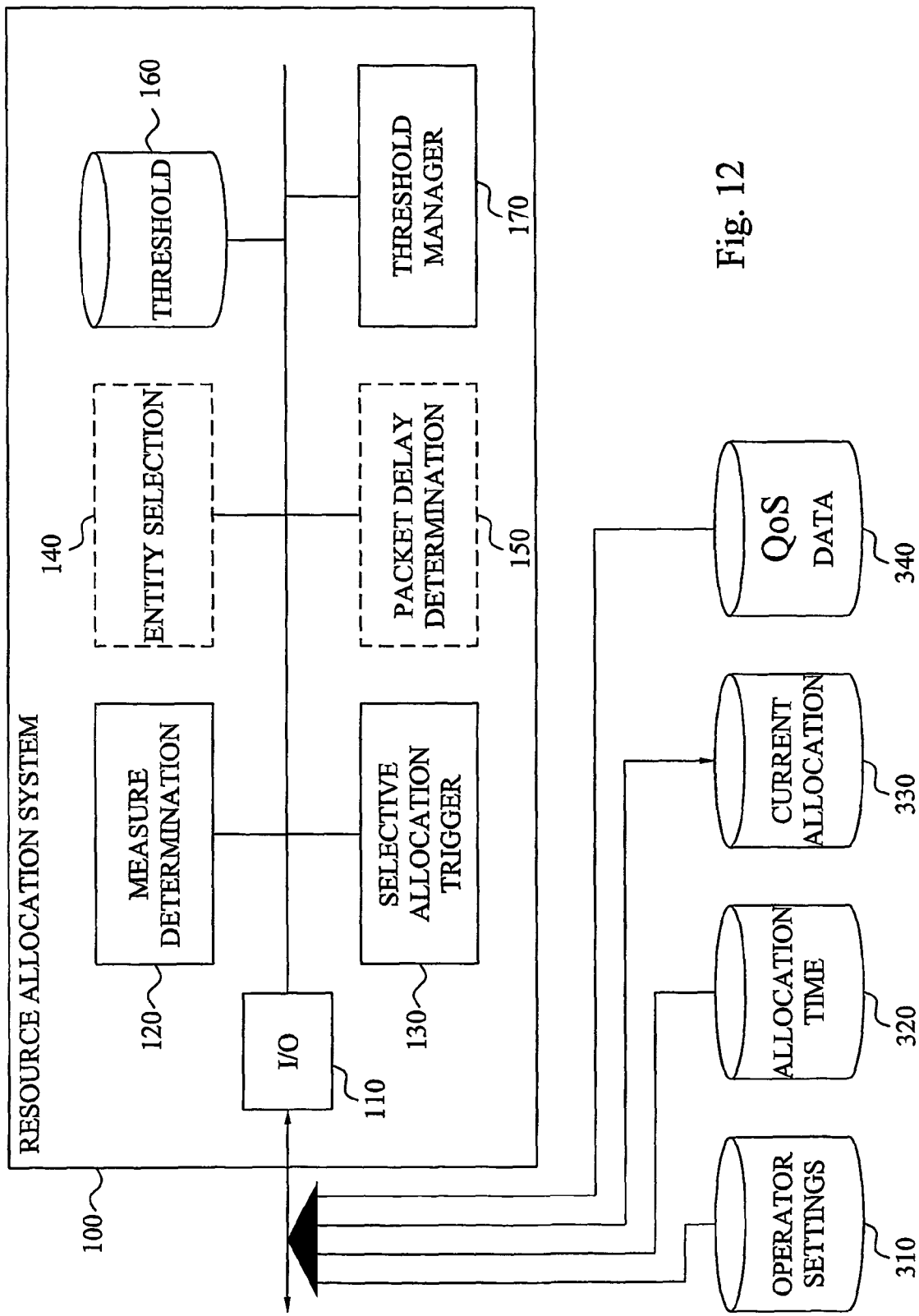
FIG. 12 is a block diagram schematically illustrating a resource allocation system.

FIG. 12 is a schematic block diagram of a resource allocation system or unit 100. The system 100 comprises an input and output (I/O) unit 110 adapted for conducting communication with external units in the communications system. In particular, this I/O unit 110 is adapted for receiving input information and data, which is used by the system 100 for performing an efficient resource management. In addition, the I/O unit 110 is adapted for transmitting resource portioning or allocation commands to a resource portioning unit that performs the actual portioning of resources for different services, links and connected end terminal (user equipment) for the communications system if such portioning unit is not provided in the allocation system 100. The I/O unit 110 may also send information of possibly triggered allocation procedures to an external allocation database 330, thereby allowing updating data of a current resource allocation.

Determination means or unit 120 is provided in the allocation system 100 for determining, i.e. estimating or explicitly calculating, the resource utilization measures for the different resources classes. The determination means 120 typically receives input information, e.g. code power/peak power used for different channel, from other units, such as a database or register 330 comprising information of the current resource allocation, in the communications system for performing its determination functionality.

A selective allocation trigger 130 is provided in the system 100 for determining, based on the resource utilization measures from determining means 120, if resource allocation procedure(s) should to be triggered for the different resource classes. This allocation 130 is preferably adapted for performing the selective allocation triggering based, for each resource, on a comparison of the utilization measure with a threshold value associated with the current class. This comparison is preferably initiated for the resource class having access to the slowest resource allocation procedures, i.e. longest execution time, and then for classes with resources allocable with increasingly faster allocation procedures. These different (slow and fast) allocation procedure functions could be implemented in the resource allocation system 100, such as in the trigger 130. Alternatively, the allocation procedures could be provided elsewhere in the communications system. In such a case, the trigger 130 generates a trigger signal, which is transmitted to the correct external allocation functionality. The trigger 130 preferably also determines which allocation procedure(s) to employ for each resource class, if there is a choice.

In addition, the system 100 preferably includes selection means or unit 140 for selecting, which entity/entities to be affected by a possible resource allocation procedure as initiated by the trigger 130. This selection means 140 preferably determines which service(s), link(s) and resources to be affected of any allocation procedure. In order to facilitate this determination, the selection means 140 preferably receives input information from external units, such as databases 310, 320 and 340 comprising information of restricting utilization of the allocation procedures in some particular cases, information of available resource allocation procedures and their respective execution times and information of QoS requirements and contracts, respectively. As an alternative this entity selection functionality could be provided elsewhere in the communications system.

Optional packet delay determination means 150 can be provided in the system 100 for determining or estimating the total current packet delay for connected user equipment and preferably packet delay introduced due to an imposed TFC limitation.

The resource allocation system 100 may optionally also comprise a storage 160 adapted for storing thresholds used by the trigger 130 for determining when to trigger a resource allocation procedure and for which resource class(es). This threshold storage 160 could alternatively be provided in, or in connection with, the operator configuration database 310. An optional threshold manager 170 could be provided in the system 160 for managing the thresholds in the storage 160. This manager 170 is, in particular, adapted for entering the thresholds in the storage 160. Furthermore, the manager 170 can calculate or set some or all thresholds based on input information from external units 310, 320, 330 and 340. The manager 170 may also be adapted for (automatically) calculating the thresholds of some classes based on predetermined value(s) of one threshold or multiple thresholds.

The units 110, 120, 130, 140, 150 and 170 of the resource allocation system 100 may be provided as, date processing hardware alone or in combination with software. The units may be implemented together, e.g. in a single network node in the communications system, such as in a node in a base station system. Alternatively, a distributed implementation is also possible with some of the units provided in different network nodes of the communications system. For a radio communications system, the resource allocation system 100 could be provided in a Radio Network Controller (RNC), such as in a Drift RNC (D-RNC), a Controlling RNC (C-RNC) and/or a Serving RNC (S-RNC). As these units are traditionally employed for e.g. controlling radio resource allocation, data-flow control, congestion and admission control in radio communications, the resource allocation system 100 is preferably in a common RNC unit having the functionality of the traditional D-RNC, C-RNC and S-RNC units, or a common D-RNC and S-RNC unit, or in one, some or all of D-RNC, C-RNC and S-RNC. In particular for an embodiment of the resource allocation system 100 that is adapted for managing (restricting or increasing) the number of available transport blocks (TFC), a common D-RNC and S-RNC unit is preferred. In such a case, no inter-unit communications are required between the D-RNC unit, traditionally being employed for monitoring resource allocation and having (a layer three) functionality that considers all links, and the S-RNC unit, traditionally monitoring the data traffic on all links and having RLC—Medium Access Control (MAC) (layer two) functionality. Thus, TFC manipulating (increasing or reducing the number of available transport blocks) on a downlink channel can be employed as a fast resource allocation procedure for controlling the utilization of another resource type, i.e. average code power or carrier power.

Figure 13:
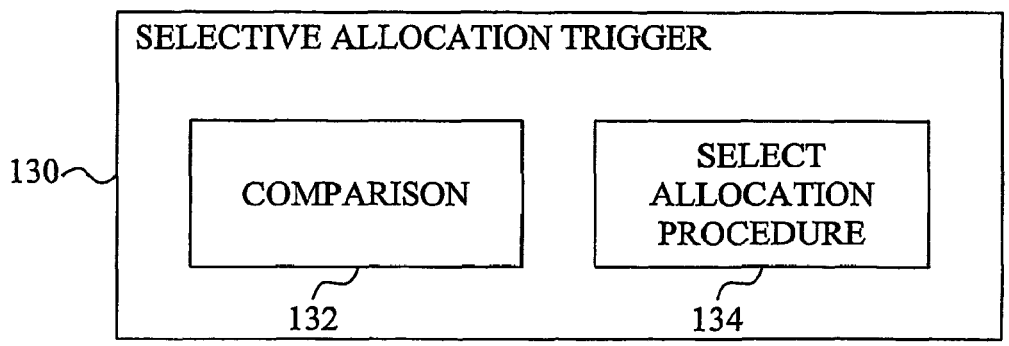
FIG. 13 is a block diagram schematically illustrating the allocation trigger of FIG. 12 in more detail.

FIG. 13 is a schematic block diagram illustrating an embodiment of the selective allocation trigger 130 of FIG. 12 in more detail. In this embodiment, the trigger preferably comprises comparison means or unit 132 adapted for comparing the resource utilization measure of a current class, as provided from determining means 120 in FIG. 12, with the threshold(s) of the current class (from storage 160) for selectively triggering a resource (reducing or assigning) allocation procedure. Furthermore, the comparison means can be adapted for comparing packet delay values from delay determining means 150 of FIG. 12, with different delay thresholds.

The trigger 130 also preferably comprises means or unit 134 for selecting an allocation procedure (or possibly several procedures) to employ for the current class if the comparison means 132 determines that a resource allocation procedure is to be initiated. Thus, for a current resource class there may be several allocation procedures available for the selecting means 134 to select among. The actual choice of procedure(s) may be based, at least partly, on input information from external units, but also on how much the measure of the current class exceeds the associated threshold.

The units 132 and 134 of the selective allocation trigger 130 may be provided as software, hardware or a combination thereof. The units may be implemented together. Alternatively, a distributed implementation is also possible.

It will be understood a person skilled in the art that various modifications and changes may be made without departure from the appended claims.

REFERENCES

[1] 3GPP TS 23.107 v5.10.0; 3rd Generation Partnership Project; Technical Specification Group Services and System Aspects; Quality of Service (QoS) concept and architecture, September 2003.

The invention claimed is:

1. A resource allocation method in a communications system having resources, said method comprising:
a network node dividing said resources into at least a first resource class having a first associated characteristic allocation time and a second resource class having a second associated characteristic allocation time that is longer than said first associated characteristic allocation time based on respective associated characteristic allocation times of said resources, where a resource of said first resource class is allocable with an allocation procedure of a first allocation procedure set, said first associated characteristic allocation time represents a time required for allocating or reallocating a resource of said first resource class, a resource of said second resource class is allocable with an allocation procedure of a second, different allocation procedure set, and said second associated characteristic allocation time is a time required for allocating or reallocating a resource of said second resource class,
for each resource class of said at least first resource class and said second resource class:
the network node determining a resource utilization measure; and
the network node selecting whether or not to trigger resource allocation based on said resource utilization measure.

2. The method according to claim 1, wherein determining said resource utilization measure and selecting whether or not to trigger resource allocation are first performed for said second resource class and are then performed for first second resource class.

3. The method according to claim 1, wherein selecting whether or not to trigger resource allocation comprises:
comparing said resource utilization measure with a threshold associated with said resource class; and
triggering resource allocation if said resource utilization measure exceeds said threshold.

4. The method according to claim 3, wherein a first threshold associated with said first resource class is larger than a corresponding second threshold associated with said second resource class.

5. The method according to claim 3, wherein said communications system provides a guaranteed minimum amount of resources of said first resource class to a connected user equipment, and a resource utilization measure of said first resource class exceeds said first threshold and a resource utilization measure of said second resource class exceeds said second threshold, said method comprising:
triggering resource allocation for said second resource class; and
temporarily allocating a first resource amount of said first resource class to said connected user equipment during progression of said resource allocation for said second resource class, said first resource amount being smaller than said guaranteed minimum amount of resources, whereby a total resource utilization is temporarily reduced during said progression of said resource allocation for said second resource class.

6. The method according to claim 5, further comprising reallocating a second resource amount of said first resource class to said connected user equipment after completion of said resource allocation for said second resource class, said second resource amount being equal to or larger said guaranteed minimum amount of resources.

7. The method according to claim 3, further comprising calculating a threshold associated with said second resource class based on a threshold associated with said first resource class.

8. The method according to claim 1, wherein said resources are radio resources and said method comprising providing said radio resources to a user equipment connected to said communications system for enabling utilization of communications services available for said user equipment.

9. The method according to claim 1, wherein said first allocation procedure set comprises at least one of:
restricting available transport format combinations, TFC, for user equipment connected to said system; and
performing an Adaptive Multi Rate, AMR, mode switch for a user equipment,
and said second allocation procedure set comprises least one of:
performing a channel switch from a dedicated high bit-rate channel to a dedicated low bit-rate channel for said user equipment;
performing a channel switch from a dedicated channel to a common channel for said user equipment;
performing a handover from a first radio access network to a second radio access network for said user equipment;
performing a handover from a first carrier frequency to a second carrier frequency for said user equipment; and
dropping an ongoing call for said user equipment.

10. The method according to claim 1, wherein determining said resource utilization measure is performed periodically.

11. The method according to claim 1, wherein determining said resource utilization measure is performed upon a triggering event selected from at least one of:
a change in the number of available channels for connected user equipment;
a change in the number of connected user equipment;
a change in the number of provided services per user equipment;
a change in QoS requirements of an on-going communications service for connected user equipment;
a reception of an updated mobility measurement report;
a reception of an updated interference measurement report; and
a change in data traffic.

12. The method according to claim 1, further comprising selecting any resource to be allocated based on information of QoS requirements for connected user equipment.

13. The method according to claim 1, further comprising selecting any resource to be allocated based on resource saving estimation information.

14. The method according to claim 1, wherein determining said resource utilization measure comprises estimating a total power of communications links used for said resource class.

15. A resource allocation system provided in a communications system having resources, said resources being divided into at least a first resource class having a first associated characteristic allocation time and a second resource class having a second associated characteristic allocation time that is longer than said first associated characteristic allocation time based on respective associated characteristic allocation times of said resources, where a resource of said first resource class is allocable with an allocation procedure of a first allocation procedure set, said first associated characteristic allocation time represents a time required for allocating or reallocating a resource of said first resource class, a resource of said second resource class is allocable with an allocation procedure of a second, different allocation procedure set, and said second associated characteristic allocation time is a time required for allocating or reallocating a resource of said second resource class, said resource allocation system comprising:

determination means for determining, for each resource class, a resource utilization measure; and selectively allocation triggering means for selectively triggering, for each resource class and in dependence of said resource utilization measure, resource allocation according to an allocation procedure available for a respective resource class.

16. The system according to claim 15, wherein said determination means and said selectively allocation trigger means are configured for first performing said measure determination and said selectively allocation triggering for said second resource class and then performing said measure determination and selectively allocation triggering for said first resource class.

17. The system according to claim 15, wherein said selectively allocation triggering means comprises:

means for comparing said resource utilization measure with a threshold associated with a resource class; and means for triggering said resource allocation if said resource utilization measure exceeds said threshold.

18. The system according to claim 17, wherein a first threshold associated with said first resource class is larger than a corresponding second threshold associated with said second resource class.

19. The system according to claim 18, wherein said communications system provides a guaranteed minimum amount of resources of said first resource class to a connected user equipment, and a resource utilization measure of said first resource class exceeds said first threshold and a resource utilization measure of said second resource class exceeds said corresponding second threshold, said selectively allocation triggering means is configured for:

triggering of resource allocation for said second resource class; and temporarily allocation of a first resource amount of said first resource class to a user equipment during progression of said resource allocation for said second resource class, said first resource amount being smaller than said guaranteed minimum amount of resources.

20. The system according to claim 19, further comprising means for reallocating a second resource amount of said first resource class to said user equipment after completion of said resource allocation for said second resource class, said second resource amount being equal to or larger said guaranteed minimum amount of resources.

21. The system according to claim 17, further comprising means for calculating a threshold associated with said second resource class based on a threshold associated with said first resource class.

22. The system according to claim 15, wherein said characteristic allocation time is a total time required for said selectively allocation triggering means to allocate or reallocate a resource of said resource class.

23. The system according to claim 15, wherein said determination means is configured for determining said resource utilization measure periodically.

24. The system according to claim 15, wherein said determination means is configured for determining said resource utilization measure in response to triggering input information.

25. The system according to claim 15, comprising means for selection of any resource to be allocated based on information of QoS requirements for connected user equipment.

26. The system according to claim 15, comprising means for selection of any resource to be allocated based on resource saving estimation information.

27. The system according to claim 15, wherein said determination means is configured for estimating a total power of communications links used for said resource class.

28. The system according to claim 15, wherein said resource allocation system is provided in a network node of said communications system.

29. Communications system having resources, said system comprising:

means for dividing said resources into at least a first resource class having a first associated characteristic allocation time and a second resource class having a second associated characteristic allocation time that is longer than said first associated characteristic allocation time based on respective associated characteristic allocation times of said resources, where a resource of said first resource class is allocable with an allocation procedure of a first allocation procedure set, said first associated characteristic allocation time represents a time required for allocating or reallocating a resource of said first resource class, a resource of said second resource class is allocable with an allocation procedure of a second, different allocation procedure set, and said second associated characteristic allocation time is a time required for allocating or reallocating a resource of said second resource class, and resource allocation means for performing, for each resource class:

determination of a resource utilization measure; and selectively triggering of resource allocation according to an allocation procedure available for said resource class, in dependence of a respective resource utilization measure.

30. The system according to claim 29, wherein said resource allocation means is configured for first performing said measure determination and said selectively allocation triggering for said second resource class and are then performing said measure determination and selectively allocation triggering for said first resource class.

31. The system according to claim 29, wherein said selectively allocation triggering means comprises:

means for comparing said resource utilization measure with a threshold associated with said resource class; and means for triggering said resource allocation if said resource utilization measure exceeds said threshold.

32. The system according to claim 31, wherein a threshold associated with said first resource class is larger than a corresponding threshold associated with said second resource class.

33. The system according to claim 31, further comprising means for calculating a threshold associated with said second resource class based on a threshold associated with said first resource class.

34. The system according to claim 29, wherein said characteristic allocation time is a total time required for said resource allocation means to allocate or reallocate a resource of said resource class.

35. The system according to claim 29, wherein said determination means is configured for estimating a total power of communications links used for a resource class.

36. The system according to claim 29, wherein said resources are radio resources and said communication system comprises means for providing said radio resources to user equipment connected to said communication system for enabling utilization of communications services available for said user equipment.

37. A resource allocation method in a communications system, said method comprising:
  providing a guaranteed minimum amount of resources of a first resource class and resources of a second resource class, a characteristic allocation time of said first resource class being shorter than a corresponding characteristic allocation time of said second resource class and a characteristic allocation time of a resource class represents a time required for allocating or reallocating a resource of a respective one of said first and second resource classes;
  triggering resource allocation for said second resource class using an allocation procedure of a second allocation procedure set; and
  a network node temporarily allocating a first resource amount of said first resource class using an allocation procedure of a first, different allocation procedure set during progression of said resource allocation for said second resource class, said first resource amount being smaller than said guaranteed minimum amount of resources,
  whereby a total resource utilization is temporarily reduced during a progression of said resource allocation for said second resource class.

38. The method according to claim 37, further comprising reallocating a second resource amount of said first resource class after completion of said resource allocation for said second resource class, said second resource amount being equal to or larger said guaranteed minimum amount of resources.

39. The method according to claim 37, wherein temporarily allocating said first resource amount comprises:
  calculating, for said first resource class, a first resource utilization measure;
  comparing said first resource utilization measure with a first threshold associated with said first resource class; and
  triggering said temporary resource allocation if said first resource utilization measure exceeds said first threshold.

40. The method according to claim 39, wherein triggering resource allocation comprises:
  calculating, for said second resource class, a second resource utilization measure;
  comparing said second resource utilization measure with a second threshold associated with said second resource class; and
  triggering resource allocation for said second resource class if said resource utilization measure exceeds said second threshold.

41. The method according to claim 38, wherein reallocation said second resource amount comprises:
  calculating, for said first resource class, a first resource utilization measure in response to ending said resource allocation for said second class;
  comparing said first resource utilization measure with a first threshold associated with said first resource class; and
  triggering said reallocation of said second resource amount if said first resource utilization measure is below said first threshold.

42. The method according to claim 37, further comprising:
  determining a total packet delay for user equipment connected to said communications system and utilizing resources of said first resource class;
  comparing said total packet delay with a delay threshold; and
  reallocating a second amount of said first resource class if said total delay exceeds said delay threshold, said second amount being equal to or larger than said guaranteed minimum amount of resources.

43. The method according to claim 37, further comprising:
  determining a total packet delay for user equipment connected to said communications system and utilizing resources of said first resource class;
  comparing said total packet delay with a first delay threshold;
  comparing a packet delay introduced by the temporarily resource allocation with a second delay threshold if said total delay exceeds said first delay threshold; and
  reallocating a second resource amount of said first resource class if said delay introduced by said temporarily resource allocation exceeds said second delay threshold, said second resource amount being equal to or larger than said guaranteed minimum amount of resources.

44. The method according to claim 37, wherein said communications system provides streaming services by means of at least one resource of said guaranteed minimum amount of resources and/or said resources of said second resource class to user equipment connected to said communications system.

45. The method according to claim 38, wherein temporarily allocating said first resource amount comprises temporarily reducing allowed bit-rate below a guaranteed minimum bit-rate by restricting allowed Transport Format Combination, TFC, and reallocating said second resource amount comprises increasing said allowed bit-rate to at least said guaranteed minimum bit-rate by releasing the imposed TFC restrictions.

46. A resource allocation system in a communications system providing a guaranteed minimum amount of resources of a first resource class and resources of a second resource class, a characteristic allocation time of said first resource class being shorter than a corresponding characteristic allocation time of said second resource class and a characteristic allocation time of a resource class represents a time required for allocating or reallocating a resource of a respective one of said first and second resource classes, said resource allocation system comprising:
  means for triggering resource allocation for said second resource class using an allocation procedure of a second allocation procedure set; and
  means for temporarily allocating a first resource amount of said first resource class using an allocation procedure of a first, different allocation procedure set during progression of said resource allocation for said second resource class, said first resource amount being smaller than said guaranteed minimum amount of resources,
  whereby a total resource utilization is temporarily reduced during said progression of said resource allocation for said second resource class.

47. The system according to claim 46, further comprising means for reallocating a second resource amount of said first resource class after completion of said resource allocation for said second resource class, said second resource amount being equal to or larger said guaranteed minimum amount of resources.

48. The system according to claim 46, wherein said means for temporarily allocating comprises:
- means for calculating, for said first resource class, a first resource utilization measure;
- means for comparing said first resource utilization measure with a first threshold associated with said first resource class; and
- means for triggering said temporary resource allocation if said first resource utilization measure exceeds said first threshold.

49. The system according to claim 48, wherein said means for triggering comprises:
- means for calculating, for said second resource class, a second resource utilization measure;
- means comparing said second resource utilization measure with a second threshold associated with said second resource class; and
- means for triggering resource allocation for said second resource class if said resource utilization measure exceeds said second threshold.

50. The system according to claim 49, wherein said means for reallocating comprises:
- means for calculating, for said first resource class, a first resource utilization measure in response to ending said resource allocation for said second class;
- means for comparing said first resource utilization measure with a first threshold associated with said first resource class; and
- means for triggering said reallocation of said second resource amount if said first resource utilization measure is below said first threshold.

51. The system according to claim 46, further comprising:
- means for determining a total packet delay for user equipment connected to said communications system and utilizing resources of said first resource class;
- means for comparing said total packet delay with a delay threshold; and
- means for reallocating a second resource amount of said first resource class if said total delay exceeds said delay threshold, said second resource amount being equal to or larger than said guaranteed minimum amount of resources.

52. The method according to claim 46, further comprising:
- means for determining a total packet delay for user equipment connected to said communications system and utilizing resources of said first resource class;
- means for comparing said total packet delay with a first delay threshold;
- means for comparing a packet delay introduced by said temporarily resource allocation with a second delay threshold if said total delay exceeds said first delay threshold; and
- means for reallocating a second resource amount of said first resource class if said delay introduced by said temporarily resource allocation exceeds said second delay threshold, said second resource amount being equal to or larger than said guaranteed minimum amount of resources.

53. The system according to claim 46, wherein said communications system is adapted for providing streaming services by means of at least one resource of said guaranteed minimum amount of resources and/or said resources of said second resource class to user equipment connected to said communications system.

54. The system according to claim 47, wherein said means for temporarily allocating is configured for temporarily reducing allowed bit-rate below a guaranteed minimum bit-rate by restricting allowed Transport Format Combinations, TFC, and said means for reallocating is configured for increasing said allowed bit-rate to at least said guaranteed minimum bit-rate by releasing the imposed TFC restrictions.

* * * * *